(12) United States Patent
Sortore et al.

(10) Patent No.: US 8,987,959 B2
(45) Date of Patent: Mar. 24, 2015

(54) SPLIT MAGNETIC THRUST BEARING

(75) Inventors: Christopher Sortore, Roanoke, VA (US); Victor Iannello, Roanoke, VA (US); Robert Jett Field, Fincastle, VA (US); Gary S. Ramsey, Roanoke, VA (US); George R. Erdman, Roanoke, VA (US)

(73) Assignee: Dresser-Rand Company, Olean, NY (US)

( * ) Notice: Subject to any disclaimer, the term of this patent is extended or adjusted under 35 U.S.C. 154(b) by 634 days.

(21) Appl. No.: 13/167,106

(22) Filed: Jun. 23, 2011

(65) Prior Publication Data

US 2011/0316376 A1    Dec. 29, 2011

Related U.S. Application Data

(60) Provisional application No. 61/357,564, filed on Jun. 23, 2010.

(51) Int. Cl.
*H02K 7/09* (2006.01)
*F16C 32/04* (2006.01)

(52) U.S. Cl.
CPC .............. *H02K 7/09* (2013.01); *F16C 32/0459* (2013.01); *F16C 32/0476* (2013.01)
USPC ..................................................... 310/90.5

(58) Field of Classification Search
CPC ....... H02K 7/09; H02K 1/182; H02K 1/2793; H02K 21/026; F16C 32/04; F16C 32/044; F16C 32/0406; F16C 32/0459; F16C 32/0461; F16C 32/0463; F16C 32/0474; F16C 32/0476

USPC ........................................................ 310/90.5
See application file for complete search history.

(56) References Cited

U.S. PATENT DOCUMENTS

| | | |
|---|---|---|
| 2,221,983 A | 11/1940 | Mayer |
| 2,408,641 A | 10/1946 | Hitchcock |
| 2,877,366 A | 3/1959 | Carr |
| 3,146,300 A | 8/1964 | Beckius et al. |
| 3,221,194 A | 11/1965 | Blackburn |
| 3,715,659 A | 2/1973 | Abnett |
| 3,777,194 A | 12/1973 | Schaefer |
| 4,043,614 A * | 8/1977 | Lyman .................. 310/90.5 |
| 4,080,012 A | 3/1978 | Boden |
| 4,112,751 A | 9/1978 | Grunbaum |

(Continued)

FOREIGN PATENT DOCUMENTS

| | | |
|---|---|---|
| CN | 2706952 | 6/2005 |
| CN | 101438358 | 5/2009 |

(Continued)

OTHER PUBLICATIONS

EP 0 693 630—European Search Report dated Oct. 31, 1997.

(Continued)

*Primary Examiner* — Quyen Leung
*Assistant Examiner* — Eric Johnson
(74) *Attorney, Agent, or Firm* — Edmonds & Nolte, PC

(57) ABSTRACT

A magnetic bearing thrust stator is provided including, a plurality of stator sectors. Each of the stator sectors includes a semi-circumferentially slotted stator portion including a plurality of semi-circumferential poles and a first coil portion shaped to fit substantially within the semi-circumferentially slotted stator portion.

10 Claims, 14 Drawing Sheets

(56) References Cited

U.S. PATENT DOCUMENTS

| | | | |
|---|---|---|---|
| 4,117,360 A | 9/1978 | Richter | |
| 4,144,469 A | 3/1979 | Miyashita | |
| 4,177,360 A | 12/1979 | Fujimoto | |
| 4,199,952 A | 4/1980 | Berg | |
| 4,245,869 A | 1/1981 | Scheffer | |
| 4,270,936 A | 6/1981 | Mann | |
| 4,286,010 A | 8/1981 | Staley | |
| 4,353,602 A * | 10/1982 | Habermann | 310/90.5 |
| 4,389,849 A | 6/1983 | Gasser et al. | |
| 4,618,792 A | 10/1986 | Yates | |
| 4,650,132 A | 3/1987 | Graf et al. | |
| 4,703,211 A * | 10/1987 | Yazaki et al. | 310/179 |
| 4,703,662 A | 11/1987 | Gabelli | |
| 4,742,258 A | 5/1988 | Earle | |
| 4,893,040 A | 1/1990 | Turner | |
| 4,896,088 A | 1/1990 | Jahns | |
| 4,920,291 A | 4/1990 | McSparran | |
| 4,962,085 A | 10/1990 | deBarbadillo | |
| 4,962,089 A | 10/1990 | Boden | |
| 4,982,126 A | 1/1991 | Jolivet et al. | |
| 5,013,987 A | 5/1991 | Wakui | |
| 5,021,698 A | 6/1991 | Pullen | |
| 5,136,854 A | 8/1992 | Abdelmalek | |
| 5,153,475 A | 10/1992 | McSparran | |
| 5,250,865 A | 10/1993 | Meeks | |
| 5,256,638 A | 10/1993 | Weinberger | |
| 5,291,735 A | 3/1994 | Kesten | |
| 5,300,841 A | 4/1994 | Preston | |
| 5,300,842 A | 4/1994 | Lyons | |
| 5,300,843 A | 4/1994 | Lyons | |
| 5,327,069 A | 7/1994 | Radun | |
| 5,347,190 A | 9/1994 | Lewis | |
| 5,355,041 A | 10/1994 | Shirao | |
| 5,355,042 A | 10/1994 | Lewis | |
| 5,434,427 A | 7/1995 | Crane | |
| 5,469,007 A | 11/1995 | Toyama | |
| 5,530,306 A | 6/1996 | Ueyama | |
| 5,539,323 A | 7/1996 | Davis | |
| 5,543,673 A * | 8/1996 | Katsumata et al. | 310/90.5 |
| 5,554,583 A | 9/1996 | Hull | |
| 5,565,722 A | 10/1996 | Rubner | |
| 5,578,880 A | 11/1996 | Lyons | |
| 5,682,071 A | 10/1997 | Buhler | |
| 5,705,869 A * | 1/1998 | Kliman et al. | 310/90.5 |
| 5,705,918 A | 1/1998 | Davis | |
| 5,729,066 A | 3/1998 | Soong | |
| 5,739,609 A | 4/1998 | Ueyama | |
| 5,743,654 A | 4/1998 | Ide | |
| 5,757,196 A | 5/1998 | Wetzel | |
| 5,760,510 A | 6/1998 | Nomura | |
| 5,761,921 A | 6/1998 | Hori | |
| 5,808,392 A | 9/1998 | Sakai | |
| 5,811,905 A | 9/1998 | Tang | |
| 5,857,348 A | 1/1999 | Conry | |
| 5,866,964 A | 2/1999 | Li | |
| 5,872,507 A | 2/1999 | Weber | |
| 5,878,584 A | 3/1999 | Sasaki | |
| 5,880,549 A | 3/1999 | Chiba | |
| 5,894,210 A | 4/1999 | Brown | |
| 5,923,142 A | 7/1999 | Li | |
| 5,936,370 A | 8/1999 | Fukao | |
| 5,939,807 A | 8/1999 | Patyk | |
| 5,955,811 A | 9/1999 | Chiba | |
| 5,962,942 A | 10/1999 | Pullen | |
| 5,973,468 A | 10/1999 | Yamauchi | |
| 6,014,002 A | 1/2000 | Guinet | |
| 6,040,650 A | 3/2000 | Rao | |
| 6,050,083 A | 4/2000 | Meckler | |
| 6,104,111 A | 8/2000 | Pullen | |
| 6,147,425 A | 11/2000 | Ueyama | |
| 6,148,634 A | 11/2000 | Sherwood | |
| 6,181,092 B1 | 1/2001 | Turner | |
| 6,184,640 B1 | 2/2001 | Kawashima | |
| 6,194,800 B1 | 2/2001 | Maruyama | |
| 6,195,869 B1 | 3/2001 | Pullen | |
| 6,198,183 B1 | 3/2001 | Baeumel | |
| 6,198,803 B1 | 3/2001 | Osama | |
| 6,208,051 B1 | 3/2001 | Ando | |
| 6,233,938 B1 | 5/2001 | Nicodemus | |
| 6,253,563 B1 | 7/2001 | Ewert | |
| 6,304,011 B1 | 10/2001 | Pullen | |
| 6,309,188 B1 | 10/2001 | Danner | |
| 6,326,712 B1 | 12/2001 | Nakazawa | |
| 6,346,757 B1 | 2/2002 | Shinozaki | |
| 6,350,109 B1 * | 2/2002 | Brunet et al. | 417/365 |
| 6,362,549 B1 | 3/2002 | Shi | |
| 6,380,652 B1 | 4/2002 | Ueyama | |
| 6,388,981 B1 | 5/2002 | Sohn | |
| 6,404,097 B1 | 6/2002 | Pullen | |
| 6,424,069 B1 | 7/2002 | Pullen | |
| 6,441,580 B1 | 8/2002 | Marcinkiewicz | |
| 6,455,966 B1 | 9/2002 | Barada | |
| 6,469,487 B2 | 10/2002 | Ewert | |
| 6,472,787 B1 | 10/2002 | Kameno | |
| 6,483,212 B1 | 11/2002 | Mimura | |
| 6,486,683 B1 | 11/2002 | Nussbaum | |
| 6,489,701 B1 | 12/2002 | Gamble | |
| 6,515,387 B1 | 2/2003 | Shinozaki | |
| 6,519,273 B2 | 2/2003 | Sekiguchi | |
| 6,559,568 B2 | 5/2003 | Maejima | |
| 6,570,285 B2 | 5/2003 | Shinozaki | |
| 6,590,366 B1 | 7/2003 | Browning | |
| 6,617,733 B1 | 9/2003 | Yamauchi | |
| 6,617,734 B2 | 9/2003 | Taniguchi | |
| 6,657,345 B2 | 12/2003 | Shinozaki | |
| 6,657,348 B2 | 12/2003 | Quin | |
| 6,666,134 B2 | 12/2003 | Gusching | |
| 6,735,945 B1 | 5/2004 | Hall | |
| 6,770,992 B2 | 8/2004 | Yamauchi | |
| 6,777,841 B2 | 8/2004 | Steinmeyer | |
| 6,798,097 B2 | 9/2004 | Pullen | |
| 6,809,449 B2 | 10/2004 | Shinozaki | |
| 6,809,450 B1 | 10/2004 | Morrison | |
| 6,822,355 B2 | 11/2004 | Karrelmeyer | |
| 6,831,384 B2 | 12/2004 | Ries | |
| 6,849,979 B2 | 2/2005 | Brunet | |
| 6,873,075 B2 | 3/2005 | Taira | |
| 6,892,522 B2 | 5/2005 | Brasz | |
| 6,912,773 B2 | 7/2005 | Pullen | |
| 6,927,550 B2 | 8/2005 | Tamisier | |
| 6,949,853 B2 | 9/2005 | Kawashima | |
| 6,984,907 B2 | 1/2006 | Barada | |
| 6,997,010 B2 | 2/2006 | Suzuki | |
| 7,002,273 B2 | 2/2006 | Schippl | |
| 7,005,864 B2 | 2/2006 | Iannello | |
| 7,013,644 B2 | 3/2006 | Radcliff | |
| 7,017,357 B2 | 3/2006 | Brasz | |
| 7,023,118 B1 | 4/2006 | Morrison | |
| 7,053,511 B2 | 5/2006 | Taniguchi | |
| 7,053,582 B2 | 5/2006 | Ueyama | |
| 7,065,979 B2 | 6/2006 | Arshansky | |
| 7,091,641 B2 | 8/2006 | Kawashima | |
| 7,138,738 B2 | 11/2006 | Shimada | |
| 7,156,627 B2 | 1/2007 | Lenderink | |
| 7,235,907 B2 | 6/2007 | Shimada | |
| 7,268,453 B2 | 9/2007 | Shimada | |
| 7,274,123 B2 | 9/2007 | Shimada | |
| 7,285,887 B2 | 10/2007 | Shimada | |
| 7,288,915 B2 | 10/2007 | Norman | |
| 7,343,663 B2 | 3/2008 | Hodowanec | |
| 7,355,833 B2 | 4/2008 | Kozaki | |
| 7,394,229 B2 | 7/2008 | Lim | |
| 7,436,093 B2 | 10/2008 | Brunet | |
| 7,466,051 B2 | 12/2008 | Miya | |
| 7,471,022 B2 | 12/2008 | Sortore | |
| 7,501,782 B2 | 3/2009 | Buhler | |
| 7,536,869 B2 | 5/2009 | Inaba | |
| 7,545,066 B2 | 6/2009 | Baudelocque | |
| 7,564,670 B2 | 7/2009 | Kozaki | |
| 7,583,000 B2 | 9/2009 | Durham | |
| 7,633,201 B2 | 12/2009 | Buhler | |
| 7,635,937 B2 | 12/2009 | Brunet | |
| 7,679,248 B2 | 3/2010 | Kozaki | |
| 7,687,948 B2 | 3/2010 | Sortore | |

(56) References Cited

U.S. PATENT DOCUMENTS

| | | |
|---|---|---|
| 7,737,590 B2 | 6/2010 | Oyama |
| 7,932,655 B2 | 4/2011 | Buhler |
| 7,944,104 B2 | 5/2011 | Barada |
| 7,977,839 B2 | 7/2011 | Barada |
| 7,986,070 B2 | 7/2011 | Baudelocque |
| 8,018,106 B2 | 9/2011 | Buhler |
| 2001/0024099 A1 | 9/2001 | Greif |
| 2002/0029897 A1 | 3/2002 | Younsi |
| 2002/0148225 A1 | 10/2002 | Lewis |
| 2002/0149331 A1 | 10/2002 | Marcinkiewicz |
| 2002/0176943 A1 | 11/2002 | Pereira |
| 2003/0038553 A1 | 2/2003 | Andres |
| 2003/0132673 A1 | 7/2003 | Zhou |
| 2004/0046467 A1 | 3/2004 | Huang |
| 2004/0088992 A1 | 5/2004 | Brasz |
| 2004/0189132 A1 | 9/2004 | Horst |
| 2005/0070275 A1 | 3/2005 | Jeyaseelan |
| 2005/0077793 A1 | 4/2005 | Garvey |
| 2005/0110363 A1 | 5/2005 | Hoffmann |
| 2005/0223737 A1 | 10/2005 | Conry |
| 2006/0026981 A1 | 2/2006 | Inaba |
| 2006/0243683 A1 | 11/2006 | Onachilla |
| 2006/0273683 A1 | 12/2006 | Caprio |
| 2007/0200438 A1 | 8/2007 | Kaminski |
| 2007/0200440 A1 | 8/2007 | Kalsi |
| 2007/0273322 A1 | 11/2007 | Ramu |
| 2008/0045413 A1 | 2/2008 | Ko |
| 2008/0073993 A1 | 3/2008 | Sortore |
| 2008/0238234 A1 | 10/2008 | Saban |
| 2009/0261678 A1 | 10/2009 | Sortore |
| 2009/0265038 A1 | 10/2009 | Ramsey |
| 2010/0009833 A1 | 1/2010 | Ryu |
| 2010/0026120 A1* | 2/2010 | Chassoulier ................. 310/90.5 |
| 2011/0316376 A1 | 12/2011 | Sortore |

FOREIGN PATENT DOCUMENTS

| | | |
|---|---|---|
| DE | 2355104 | 5/1975 |
| EP | 0411697 | 7/1990 |
| EP | 0693630 | 1/1996 |
| EP | 0693630 | 2/1996 |
| EP | 1063753 | 12/2000 |
| FR | 2574880 | 6/1986 |
| JP | 09-149572 | 6/1997 |
| RU | 1830591 | 7/1993 |
| RU | 2241296 | 11/2004 |
| WO | WO0035230 | 6/2000 |
| WO | WO02096146 | 11/2002 |
| WO | WO2006061671 | 6/2006 |
| WO | WO2008039124 | 4/2008 |
| WO | WO2009140022 | 11/2009 |
| WO | WO2009146189 | 12/2009 |
| WO | WO2011005552 | 1/2011 |
| WO | WO2011163456 | 12/2011 |

OTHER PUBLICATIONS

PCT/SE2006/050348—International Search Report dated Feb. 24, 2007.

PCT/US2007/014090—International Search Report and Written Opinion mailed Aug. 25, 2008.

PCT/US2007/014090—International Preliminary Report on Patentability mailed Dec. 15, 2008.

PCT/US2009/040790—International Search Report and Written Opinion mailed Jun. 9, 2009.

PCT/US2009/040735—International Search Report and Written Opinion mailed Jun. 16, 2009.

PCT/US2009/059481—International Search Report and Written Opinion mailed Sep. 9, 2010.

PCT/US2009/040735—International Preliminary Report on Patentability mailed Oct. 19, 2010.

PCT/US2009/040790—International Preliminary Report on Patentability mailed Oct. 19, 2010.

PCT/US2010/039582—International Search Report and Written Opinion mailed May 31, 2011.

PCT/US2011/041593—International Search Report and Written Opinion mailed Oct. 31, 2011.

PCT/US2010/039582—International Preliminary Report on Patentability dated Jan. 4, 2012.

PCT/US2009/059481—International Preliminary Report on Patentability mailed Apr. 19, 2012.

Mushi, "Design, Construction and Modeling of a Flexible Rotor Active Magnetic Bearing Test Rig" 2009, 10 pages, Draft-Proceedings of ASME Turbo Expo 2010: Power for Land, Sea and Air, Jun. 14-18, 2010, Glasgow, UK.

Garcia, Ferreiro et al., "Diagnosis of Active Magnetic Bearings" [Diagnosis de Cojinetes Magneticos Activos], XXVII Automation Symposium, Sep. 5-7, 2001, University of Huelva, Spain (D3).

Boylestad, "Electronic Devices and Circuit Theory, 5th edition," Jan. 1, 1992, 8 pages, Prentice Hall Career & Technology, Englewood Cliffs, New Jersey.

Klyukhin, "Analysis of Eddy Current Distributions in the CMS Magnet Yoke During the Solenoid Discharge", Jun. 2005, 4 pages, IEEE Transactions on Nuclear Science, vol. 52, No. 3.

Mushi, "Design, Construction and Modeling of a Flexible Rotor Active Magnetic Bearing Test Rig", Nov. 30, 2009, 10 page(s), Draft-Proceedings of ASME Turbo Expo 2010: Power for Land, Sea and Air, Jun. 14-18, 2010, Glasgow, UK.

* cited by examiner

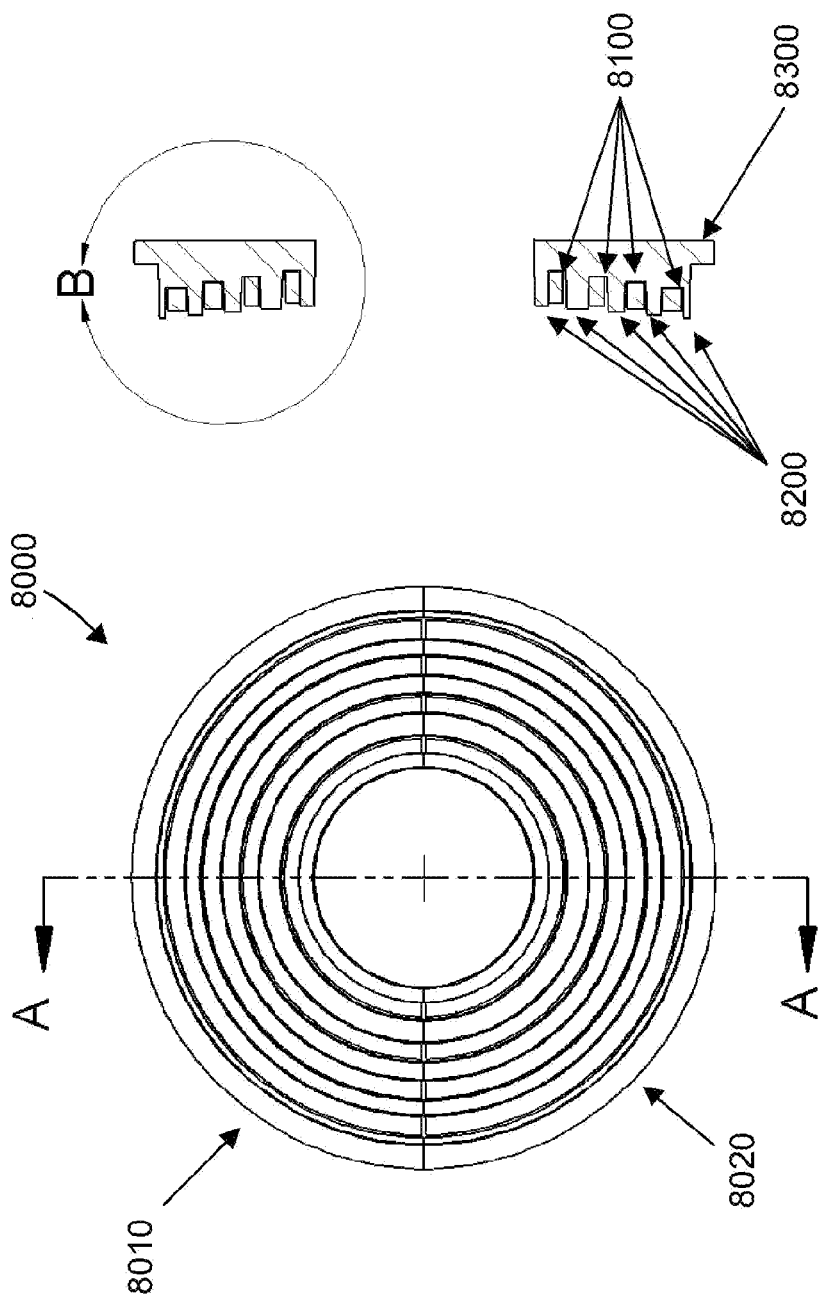

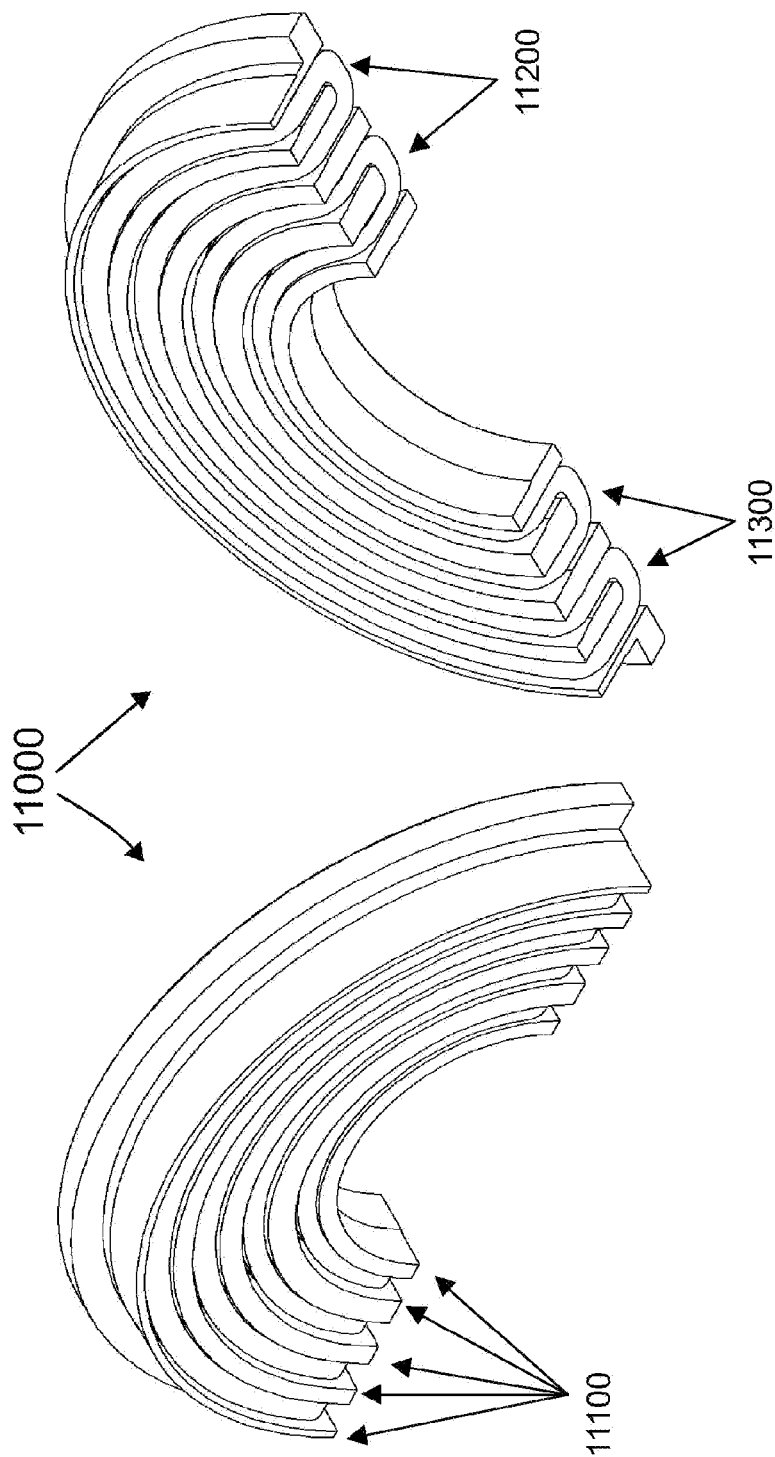

SPLIT MAGNETIC THRUST BEARING

CROSS-REFERENCES TO RELATED APPLICATIONS

This application claims priority to U.S. Provisional Patent Application 61/357,564, filed 23 Jun. 2010.

BRIEF DESCRIPTION OF THE DRAWINGS

A wide variety of potential practical and useful embodiments will be more readily understood through the following detailed description of certain exemplary embodiments, with reference to the accompanying exemplary drawings in which:

FIG. 8 is a perspective view of an exemplary thrust stator;

FIG. 9 is a cross-sectional view, viewed in the direction of the arrowheads attached to line A-A of FIG. 8, of a exemplary thrust stator;

FIG. 11 is a perspective view of an exemplary thrust stator sector;

FIG. 12 is a perspective view of an exemplary thrust stator sector;

DETAILED DESCRIPTION

Certain exemplary embodiments can provide a system, machine, device, manufacture, circuit, composition of matter, and/or user interface adapted for and/or resulting from, and/or a method and/or machine-readable medium comprising machine-implementable instructions for, activities that can comprise and/or relate to: via a thrust stator of a magnetic bearing, the thrust stator adapted to be split into sectors so that a shaft of a machine can be removed from the magnetic bearing, producing an axi-symmetric field at each pole face of the thrust stator when the sectors are operatively assembled in the machine; and/or a magnetic bearing thrust stator, comprising a plurality of stator sectors, each of the stator sectors comprising a semi-circumferentially slotted stator portion comprising a plurality of semi-circumferential poles and a first coil portion shaped to fit substantially within the semi-circumferentially slotted stator portion.

Figure 1:
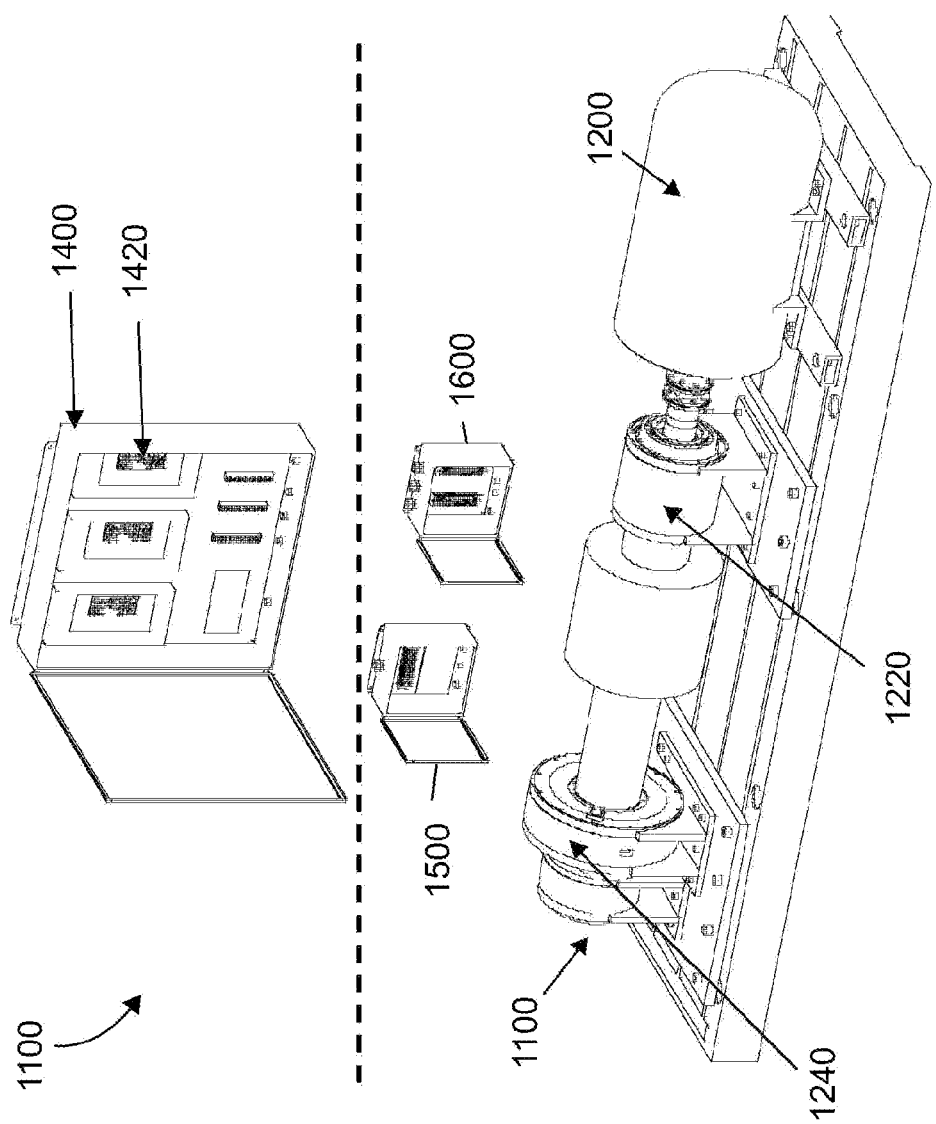
FIG. 1 is a perspective view of an exemplary embodiment of a system.
Figure 2:
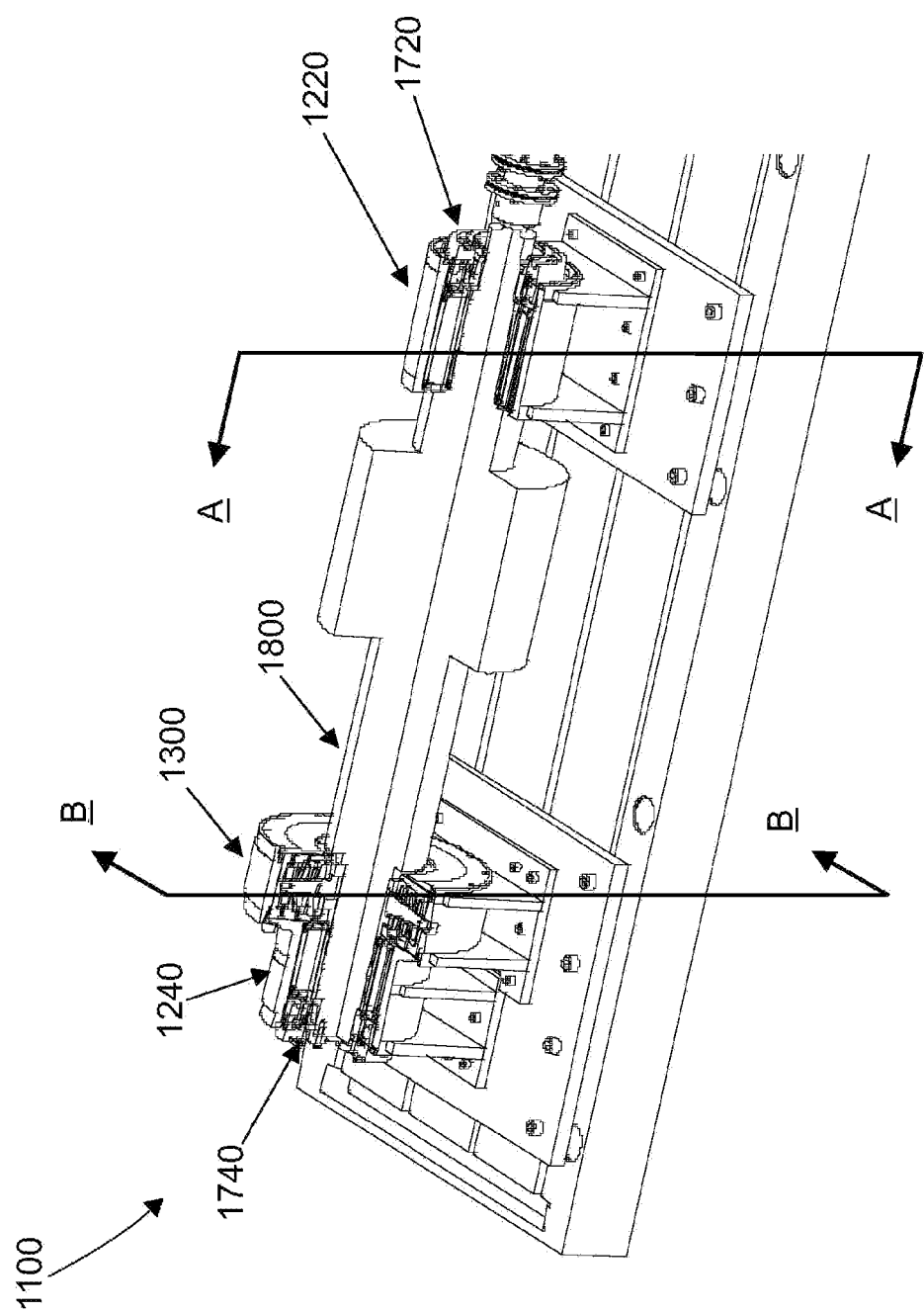
FIG. 2 is a perspective cut-away view of an exemplary embodiment of a rotating machine.

FIG. 1 shows a perspective view of an exemplary magnetic bearing system 1000, which can include a rotating machine 1100 supported via magnetic bearings. Examples of rotating machines 1100 that can benefit from magnetic bearings can include compressors, blowers, pumps, turbines, motors, and generators. Certain rotating machines can include a drive motor 1200 for powering the rotating machine. As shown in FIG. 1 and FIG. 2, magnetic bearing system 1000 can include two radial bearings 1220, 1240 supporting rotating shaft 1800 and/or maintaining a relative position of that shaft along lateral directions (perpendicular to the longitudinal axis of the shaft) and/or a thrust bearing 1300 for supporting rotating shaft 1800 and/or maintaining a relative position of that shaft along the longitudinal direction (parallel to the longitudinal axis of the shaft). Together, the three magnetic bearings (1220, 1240, 1300) can provide position and/or support along 5 axes of motion and/or can provide little resistance to rotation of the shaft. One radial bearing 1220 can be located at the non-thrust end (NTE) of the machine 1100. Radial bearing 1240 and thrust bearing 1300 can be located together at the thrust-end (TE) of the machine. At the TE, thrust bearing 1300 can located inboard of the radial bearing 1240 to maximize the accessibility of components without removing the thrust disk, thereby improving maintainability and/or serviceability. Controlling the magnetic fields generated by the bearings 1220, 1240, and/or 1300, and thus the relative position of the shaft with respect to the non-rotating portions of the rotating machine, can be a magnetic bearing controller 1420, which can provide sensor conditioning, digital processing, and/or power amplification.

Each magnetic bearing can include a non-rotating stator, which can be secured to the frame of the machine, and a rotating rotor, which can be secured to the rotating shaft. During operation, attractive magnetic forces can be developed between the stator and rotor. The forces can support and/or position the rotating shaft without the rotor contacting the stator, such that the stator is positioned adjacent to, but displaced from, the rotor.

Auxiliary bearings 1720, 1740 can be included as part of magnetic bearing system 1000 to provide support for rotating shaft 1800 should all the magnetic bearings fail and/or when power is turned off to the magnetic bearings. The design and/or location of auxiliary bearings 1720, 1740 can be chosen such that they can withstand the expected loading, have the required operational life, and/or are easily replaced in the field. In the exemplary cross section of an exemplary machine supported via magnetic bearings shown in FIG. 2, auxiliary bearings 1720, 1740 are shown located outboard of radial bearing 1220 on the NTE and outboard of the thrust bearing 1300 on the TE. Consequently, auxiliary bearings 1720, 1740 can be replaced without the removal of the rotors of radial bearings 1220, 1240 or the rotor of thrust bearing 1300.

Auxiliary bearings 1720, 1740 can be ball bearings with a radial gap between the inner race and the auxiliary bearing journals. The outer race can be mounted in a compliant ring that is in turn mounted in the bearing housing. Auxiliary bearings 1720, 1740 can be "soft-mounted" in the compliant rings to reduce the force on auxiliary bearings 1720, 1740 and/or to reduce the propensity for whirl by lowering the stiffness and/or increasing the damping. The mechanical properties for the compliant rings can be selected by performing a series of dynamic simulations of the ensuing motion of rotating shaft 1800 after it drops onto auxiliary bearings 1720, 1740 and/or selecting properties that minimize the propensity for whirl.

Magnetic bearing system 1000 can be designed to compensate for unbalance and/or other static and/or dynamic loads on rotating shaft 1800. Magnetic bearings 1220, 1240, 1300 can be designed to operate from approximately −320° F. (77 K) to an elevated temperature of approximately 300° F.

Certain exemplary embodiments of magnetic bearing system 1000 can include a controller 1420, which can be communicatively and/or electrically coupled to the magnetic bearings via a sensor electronics enclosure 1500 and/or a coil cable junction box 1600, so that controller can control the magnetic fields generated by each bearing, and thereby control the relative position of rotating shaft 1800 with respect to the non-rotating portions of rotating machine 1100. Certain exemplary embodiments of magnetic bearing system 1000 can provide a magnetic bearing controller 1420 of small size, for example, 12 in×6 in×6 in. This can provide opportunities to simplify the installation of the magnetic bearing system by mounting magnetic bearing controller 1420 in close proximity to and/or on the machine 1100, such as in an enclosure 1400. This greatly can reduce the cabling requirements and/or the time to perform the initial calibration and/or initialization of the magnetic bearing system. In such a system, the controller 1420 can be supplied with DC power and/or an Ethernet cable for communication. If desired, the controller 1420 can be located remotely from machine. Lengths of approximately 50 feet or more (e.g., up to about 100 yards) can be accommodated.

To minimize the size of the magnetic radial and/or thrust bearings, iron cobalt can be chosen for the magnetic material. The laminations for the radial bearings (stators and/or rotors) can be fabricated from Hiperco® 50 or equivalent, which is an iron cobalt alloy with approximately 49% cobalt. The thrust bearings can be fabricated from Hiperco® 27 or equivalent, which is an iron cobalt alloy with approximately 27% cobalt ("Hiperco" is a registered trademark of Carpenter Technology of Wyomissing, Pa.). To reduce the cost, silicon steel can be used for the radial bearings (stators and/or rotors), mild steel such as 1018 can be used for the thrust bearing stator, and/or high strength steel such as 4340 can be used for the thrust disk.

Certain exemplary embodiments of the magnetic bearing system can provide a multi-channel and/or 3-channel fault tolerant architecture, where a channel is a sub-system that can include a position sensor, a group of radial magnets, a thrust magnet, a controller, and/or the amplifiers of each magnet's respective coil, etc. The level of fault tolerance can be N+2, meaning that two channels can fail and the magnetic bearings can continue to operate, although each failure can reduce the load capacity of the magnetic bearings. Even with a failure of one of the channels, the remaining load capacity can be sufficient for continued operation. Note that a simple failure of one sensor or one amplifier or one magnet typically is not sufficient to cause a failure of an entire channel. Thus the typical component failure mode can result in only minor degradation of capacity.

Figure 3:
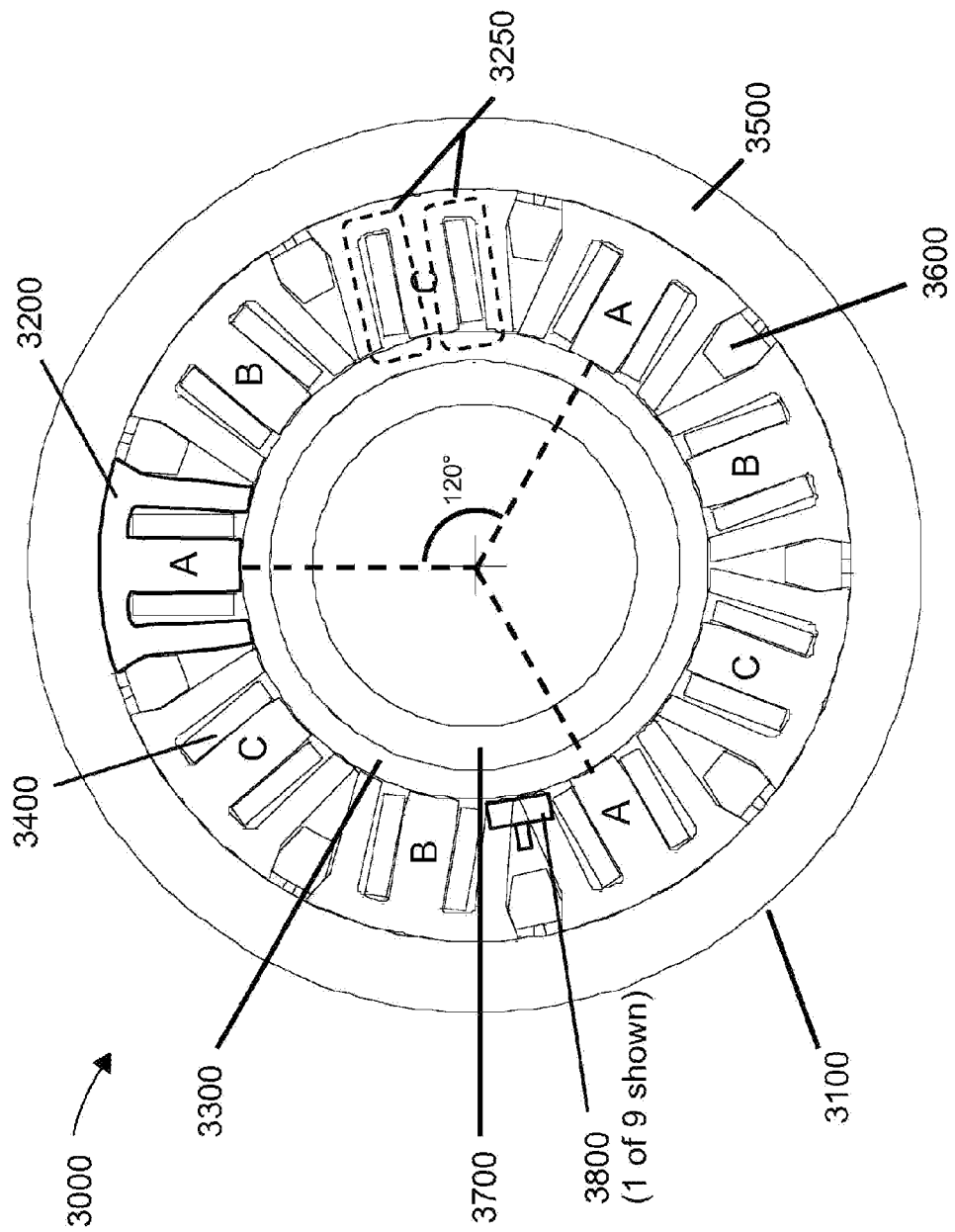
FIG. 3 is a cross-sectional view, viewed in the direction of the arrowheads attached to line A-A of FIG. 2, of a exemplary radial bearing.
Figure 4:
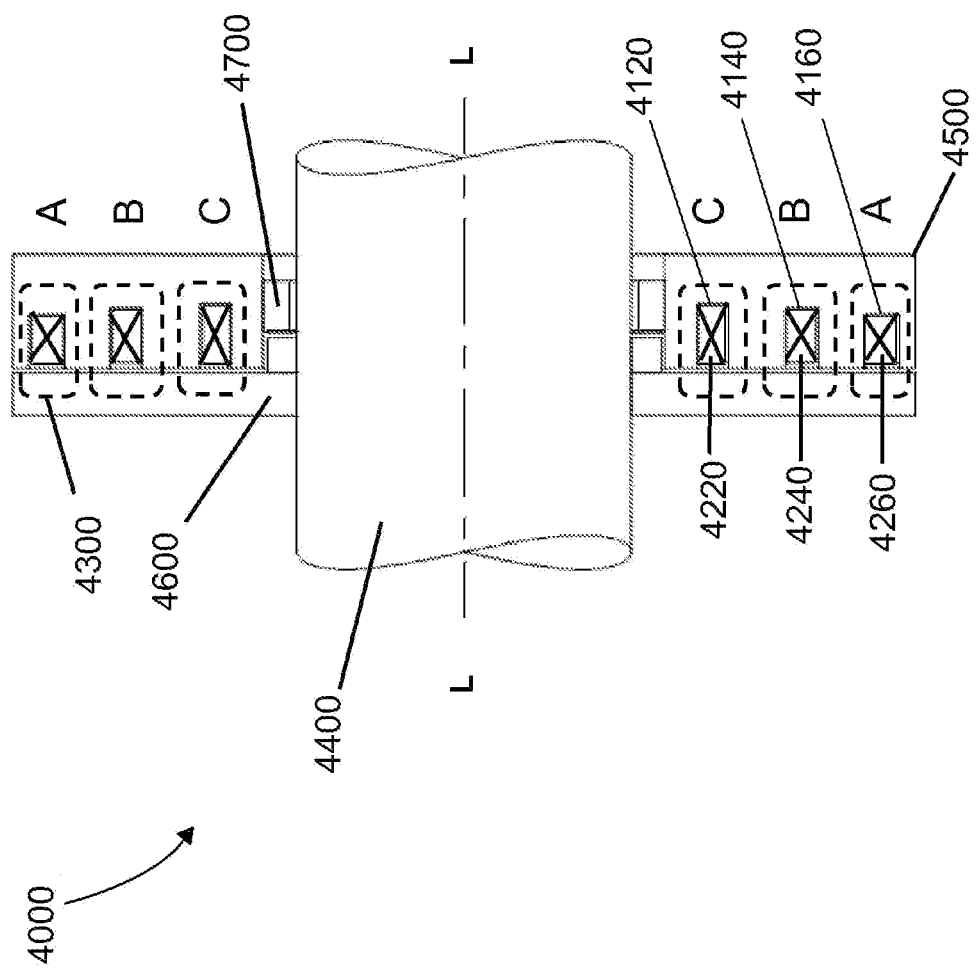
FIG. 4 is a cross-sectional view, viewed in the direction of the arrowheads attached to line B-B of FIG. 2, of a exemplary thrust bearing.

FIG. 3 and FIG. 4 show cross-sections of an exemplary fault-tolerant radial bearing 3000 and an exemplary thrust bearing 4000, respectively, where the three channels in the figures are represented by the letters A, B, and C. As shown in FIG. 3, each radial bearing stator 3100 can include, for example, nine magnets 3200 grouped into three channels of three magnets apiece. Each magnet 3200 is shown with E-shaped poles, although U-shaped poles are also possible. For each channel, the center of the magnets 3200 can be spaced approximately 120° apart about the longitudinal axis L-L (shown in FIG. 4) of the rotor so that each single channel can stably support the rotor shaft 3300 by operatively providing, in the context of FIG. 3 and FIG. 4, a vertical force component and/or, as needed, horizontal and/or longitudinal force components, to rotor shaft 3300. The magnetic flux generated by each magnet 3200 can be controlled via a current applied to a coil 3400 associated with that magnet, the current flowing through that coil inducing a magnetic field in the air gap between the rotor and stator. As shown by the flux path 3250, each magnet 3200 can be magnetically isolated so that the flux in one magnet is not necessarily influenced by the coil currents associated with the other magnets. To facilitate this magnetic isolation and/or to constrain motion of the magnets, each of magnets 3200 can be separated and/or secured to a non-magnetic housing 3500 with a non-magnetic wedge 3600, as shown. The rotor, which can include a stack of magnetic laminations that can magnetically interact with the magnets 3200, can be mounted on a hub 3700 which, in turn, can be mounted on shaft 3300. A shaft position sensor 3800 can be mounted substantially adjacent to each wedge 3600.

As shown in FIG. 4, at an exemplary thrust bearing 4000, a longitudinal position of a rotor portion 4600 with respect to a stator portion 4500 of rotating shaft 4400 can be sensed and/or detected via one or more longitudinal and/or thrust sensors 4700. To manage that longitudinal position, there can be three isolated thrust magnets 4120, 4140, 4160, each of which can be associated with a different channel (e.g., A, B, C, respectively), and/or each of which can be associated with a corresponding coil 4220, 4240, 4260, which can cause its magnet to develop a corresponding flux path 4300 that can magnetically interact with the steel of a thrust disk to influence a longitudinal position of rotating shaft 4400.

Figure 5:
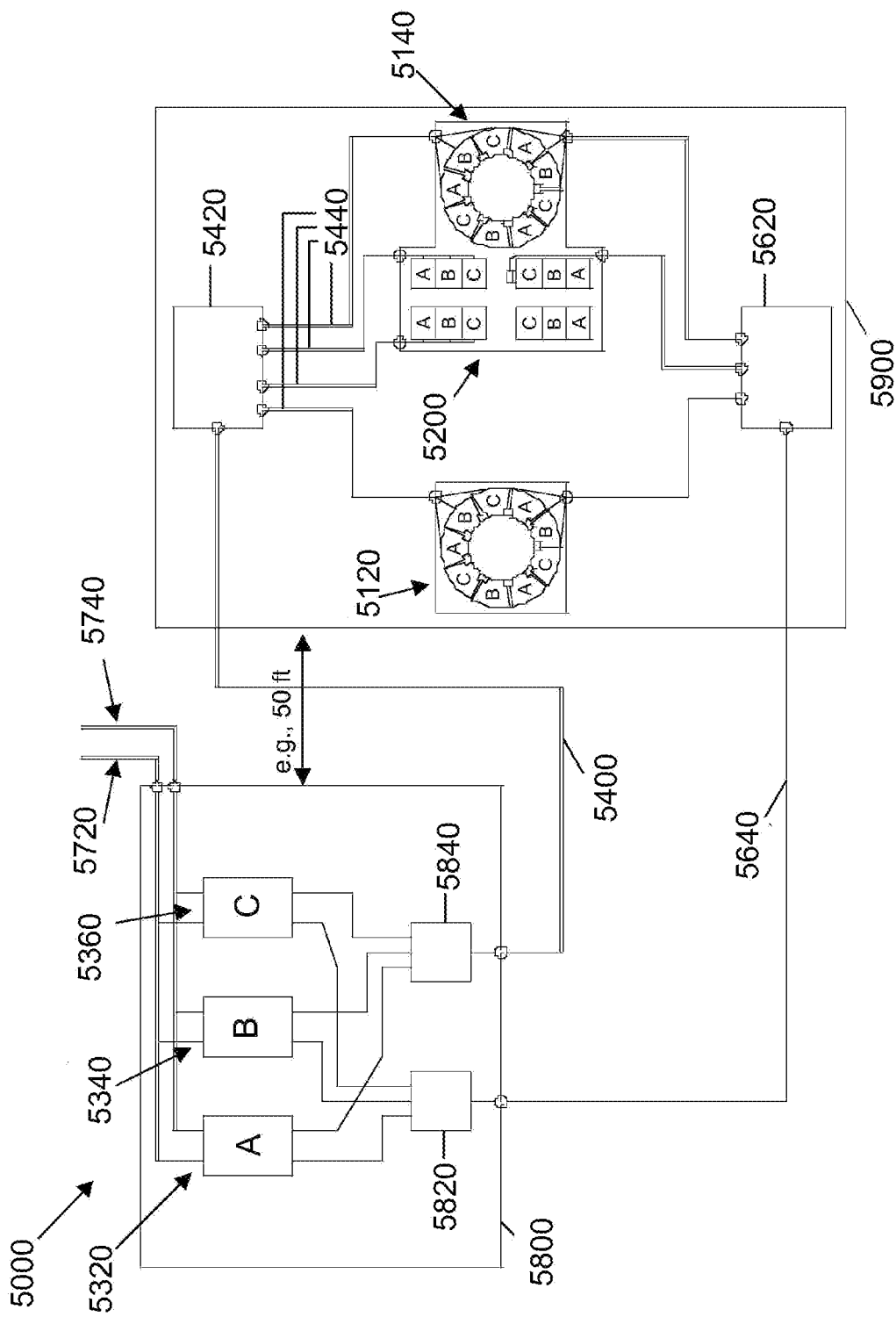
FIG. 5 is a block diagram of an exemplary fault tolerant system.

FIG. 5 is a block diagram of an exemplary fault tolerant system 5000. As shown in FIG. 5, to form a complete, distinct, and/or independent magnetic bearing control system, each channel (e.g., A, B, C) can include three magnetic sectors (e.g., A, A, and A; or B, B, and B; or C, C, and C) of each radial bearing 5120, 5140, one magnet (e.g., A, B, or C) of the thrust bearing 5200, a digital controller (e.g., 5320, 5340, or 5360), and/or amplifiers (located in each controller) for the coil of each magnet, each amplifier communicatively and/or electrically connected from a coil wire routing termination 5840 in the controller enclosure 5800 via a channel coil routing cable (e.g., 5400) to a coil cable junction box 5420 and then via a coil routing cable (e.g., 5440) to its respective coil. A failure of a channel can reduce the bearing load capacity by approximately one-third. However, the system 5000 can be designed so that with all magnets and channels in operation, the system can have capacity of approximately 120% of the required load capacity. Therefore, even upon a failure of an entire channel of system 5000, the magnetic bearings can nevertheless meet the requirement of 80% of the required load and/or can continue to fully support and/or position the rotating shaft. Even in the unlikely event of failure of two full channels, a single channel typically can be sufficient for 5-axis support of the rotating shaft.

So the magnetic bearing can continue to operate with a failed coil in the stator, the magnets within the stator can be magnetically isolated from other magnets by using non-magnetic materials for the housing and wedges. This isolation can ensure that if a coil on a stator pole develops a turn-to-turn short, the flux through that pole can be zero when the amplifier is turned off. If the magnetic flux is not zero due to flux leakage from other magnets, the varying flux can cause an induced voltage on the coil, which might lead to overheating of the coil and/or failure of the entire magnetic bearing.

There can be nine eddy current radial position sensors for each radial bearing 5120, 5140 and/or three eddy current position sensors for the thrust bearing 5200. The outputs of the sensors can be routed via sensor electronics enclosure 5620 and sensor signal cables 5640 and, for redundancy, input to all the controllers 5320, 5340, and 5360, regardless of the channel with which the sensor is associated, and/or a controller other than the controller associated with the channel. Therefore, the failure of any sensor can be detected and it need cause no degradation in the performance of the system. Note that any of the components shown within box 5900 can be machine mounted.

Any of controllers 5320, 5340, and 5360 can be located within a single enclosure 5800, which can include a sensor routing termination 5820 and a coil wire routing termination 5840. Each controller can be supplied with two sources 5720, 5740 of 440 $V_{AC}$, three-phase power. In the event of failure of one source of power, system 5000 can continue to operate without interruption.

The approach to fault tolerance described herein can provide a redundant, highly robust system.

Referring to FIG. 1 and FIG. 2, to support the shaft along the longitudinal axes in both directions, it sometimes can be helpful to incorporate two thrust bearing stators, one on each side of the thrust rotor. The thrust rotor can be a disk (sometimes called a "runner") that can be secured to the shaft. Because the thrust disk can be "captive" between the two thrust bearing stators, assembly of the machine can require the shaft first to be installed without the thrust disk followed by the installation of the inboard thrust stator followed by the installation of the thrust disk followed by the installation of the outboard thrust stator. To dissemble the machine, it can be necessary to remove the outboard thrust disk followed by removal of the thrust disk followed by removal of the inboard thrust stator followed by removal of the shaft.

The installation and removal of this thrust disk after the shaft is installed can be difficult because the disk is often secured to the shaft with an interference fit. The interference fit can be necessary to ensure that the disk remains secured to the shaft when the bore of the thrust disk grows radially due to centrifugal forces that can be developed while rotating. The thrust disk for a large machine also can be large (diameter greater than 20") and heavy (more than 100 lb). The combination of interference fit, size, and weight of the thrust disk can make it difficult and/or costly to install and/or remove the thrust disk once the shaft is installed in the machine.

Another approach can be to design a thrust stator that is horizontally split so that the machine can be assembled and/or disassembled with the thrust disk secured on the shaft. This also can permit removal of all magnetic bearings from the machine without removing the shaft. The challenge can be to design a thrust stator that can be split in half (or into 3, 4, or more sectors) and also produce a circumferentially uniform (axi-symmetric) field at the pole faces when the two halves (or the multiple sectors) are assembled in the machine. The axi-symmetric field can be required to minimize magnetic losses in the thrust rotor that can occur as the shaft is rotated.

Figures 6, 7:
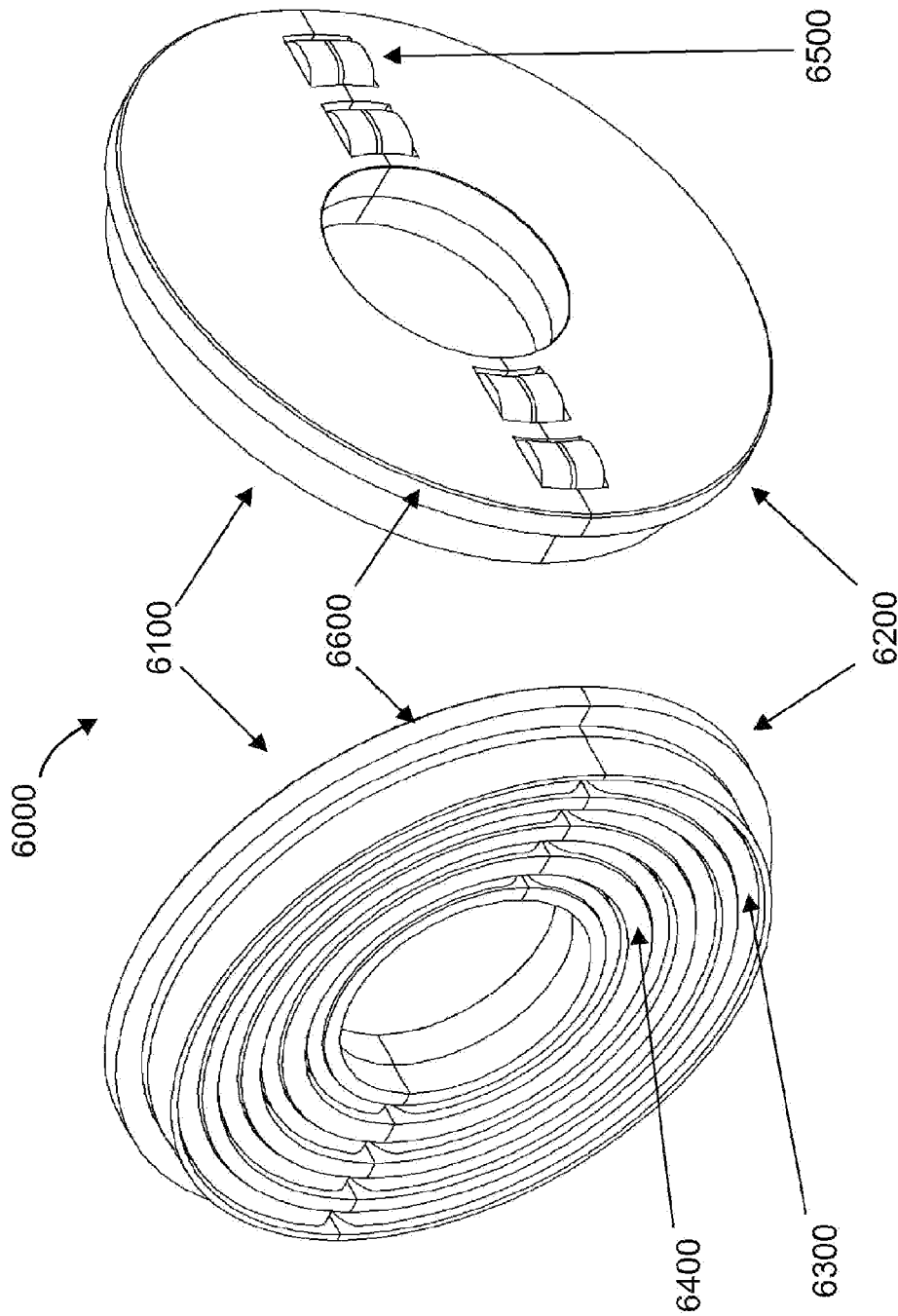
FIG. 6 is a perspective view of an exemplary thrust stator.
FIG. 7 is a perspective view of an exemplary thrust stator.

FIG. 6 and FIG. 7 show isometric views of the front and back of an exemplary thrust stator 6000 when the two sectors and/or halves 6100 and 6200 are together. Shown is a version of the thrust stator with 5 poles, which can be achieved with coils inserted into 4 circumferential slots that are formed in the stator and bounded by semi-disc 6600. One continuous coil can fill the inner two adjacent slots and/or another continuous coil 6300 can fill the outer two adjacent slots. The slots therefore can be arranged as adjacent slot pairs. The coil can follow one circumferential slot in one direction (e.g., clockwise) and/or then can connect through a U-shaped section of the coil to the adjacent circumferential slot and/or then can follow this circumferential slot in the other direction (e.g., counter clockwise). Because U-shaped bend 6500 can be formed along a plane that can be perpendicular to the circumferential path of the coil, each pole 6400 of the thrust stator can be circumferential without interruption. The poles of the stator can be of alternate magnetic polarity as one proceeds radially outward.

Figure 10:
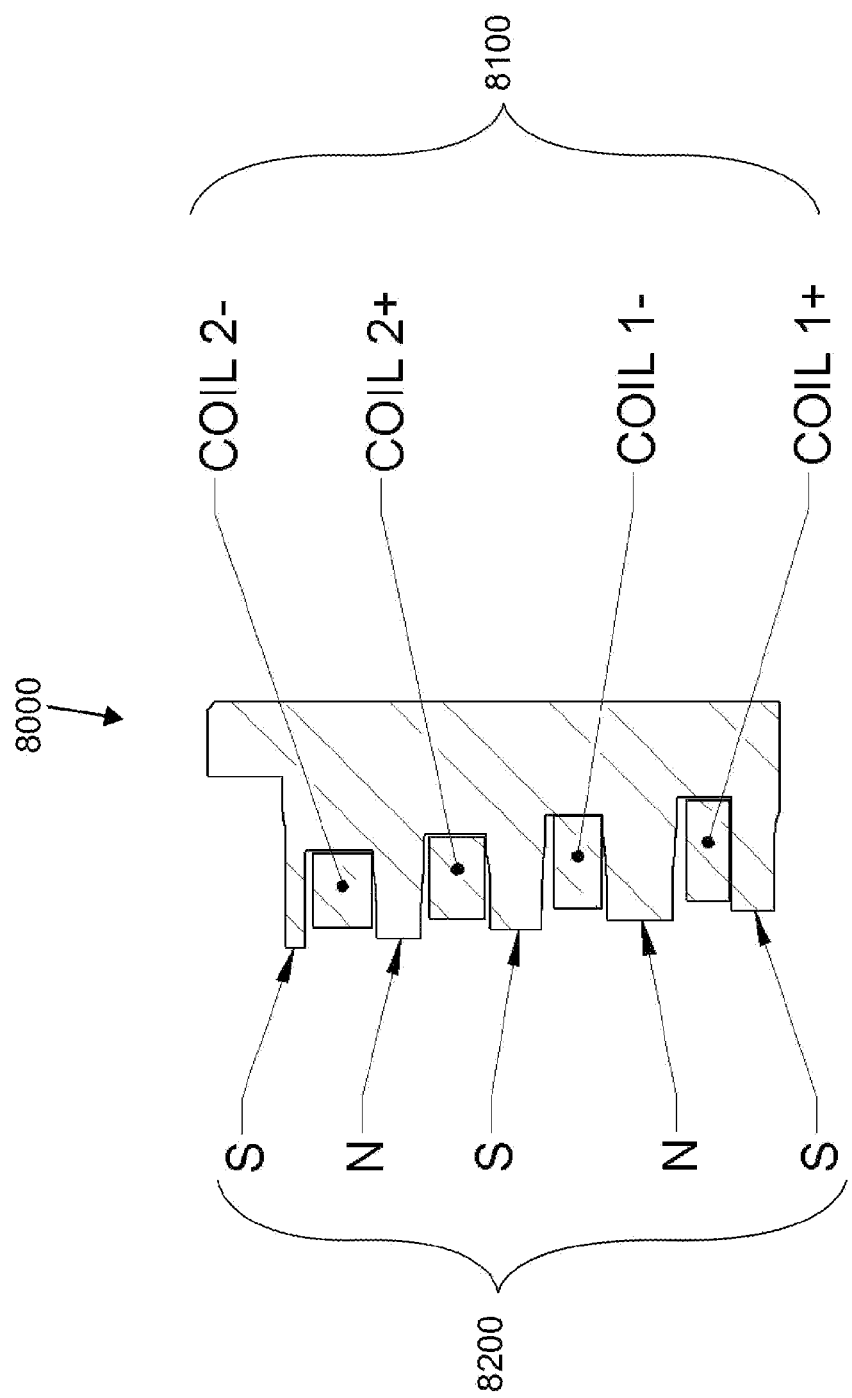
FIG. 10 is a magnified view of detail B of FIG. 9, of a exemplary thrust stator.

FIG. 8 shows a front view of an exemplary thrust stator 8000 that is divided into two semi-circumferential sectors, shown as a top half 8010 and a bottom half 8020. FIG. 9 shows a cross-sectional view of thrust stator 8000 taken at section A-A. Note how coils 8100 are separated by poles 8200, which are coupled to and/or integral to disc 8300. FIG. 10 shows a magnified view of detail B of FIG. 9, and shows the alternating and opposite polarity of several coils 8100 and poles 8200.

FIG. 11 and FIG. 12 show isometric views of a half or semi-circumferential sector of an exemplary thrust stator 11000, including semi-circumferential thrust poles 11100, semi-circumferential coils 11200, and U-shaped bends 11300.

Figure 13:
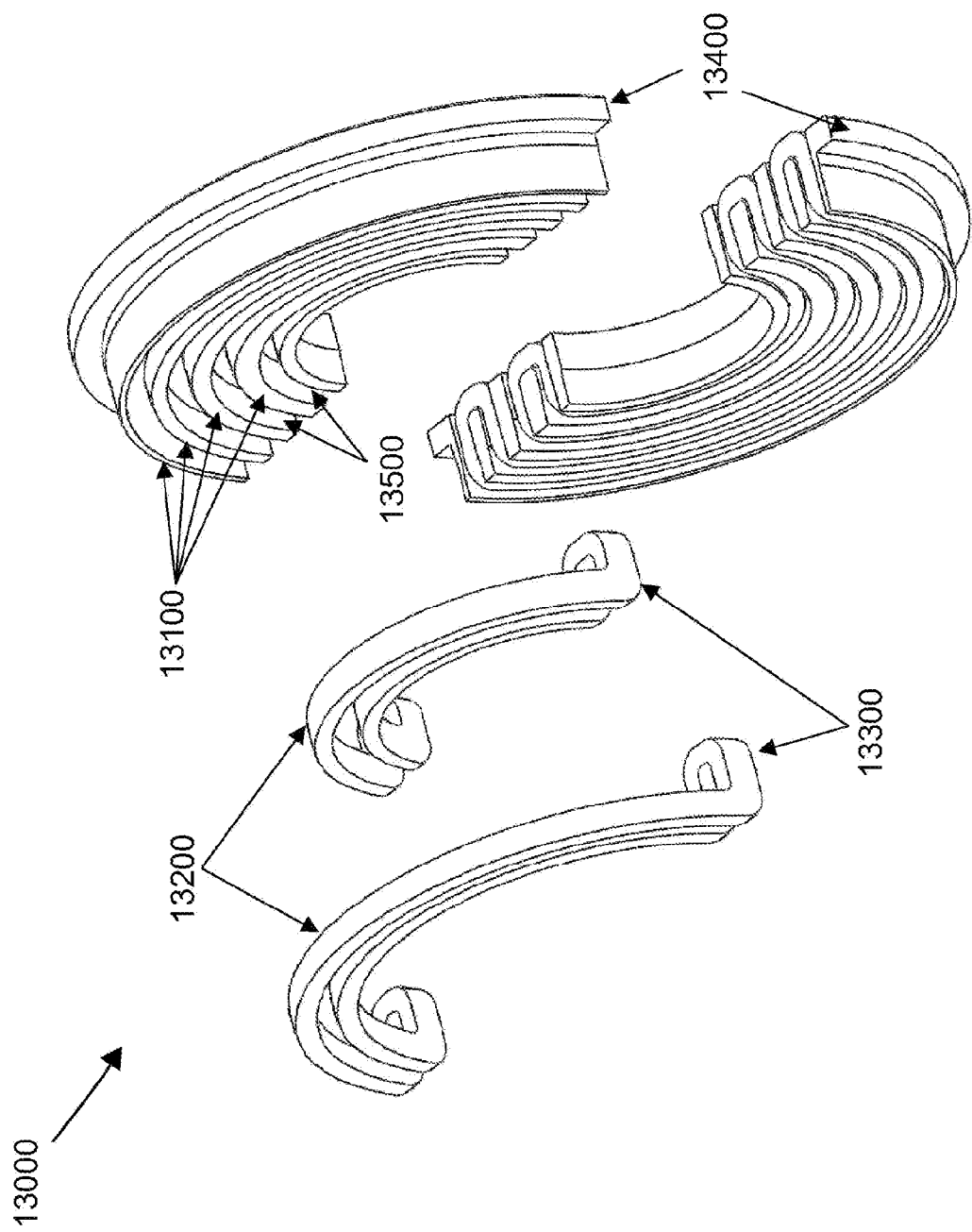
FIG. 13 is an exploded view of an exemplary thrust stator.

FIG. 13 shows an exploded view of an exemplary thrust stator 13000, including semi-circumferential poles 13100, semi-circumferential coils 13200 (formed from a pair of substantially parallel semi-toroidal portions coupled by opposing U-shaped bends 13300), semi-discs 13400, and 4 substantially parallel curved slots 13500. Note that the semi-disc 13400 of each sector extends within a plane that is substantially perpendicular to the longitudinal axis of rotation. Note also that the semi-toroidal portions of coils 13200 extend in the same plane, but that the U-shaped bends 13300 extend perpendicularly to that plane, and in a plane substantially parallel to the longitudinal axis. For redundancy, the coil pairs (where a "pair" in this context is a continuous closed-loop coil from one sector of the thrust stator that is electrically coupled to a corresponding coil (not shown) from one or more other sectors (not shown)) can be connected to independent amplifiers in independent controllers such that thrust bearing can continue to function with the failure of a channel of control. It is possible to extend the number of coils and poles to accommodate more channels of redundancy. For instance, three channels of redundancy can be achieved with a stator that has 3 coils in 6 slots with 7 poles.

Thus, certain exemplary embodiments can provide a coil shape with a U-bend in perpendicular plane that can allow the stator halves (and/or sectors) to connect so that the poles of each stator half (and/or sector) can touch without substantial interruption and/or can remain electrically coupled in series.

Figure 14:
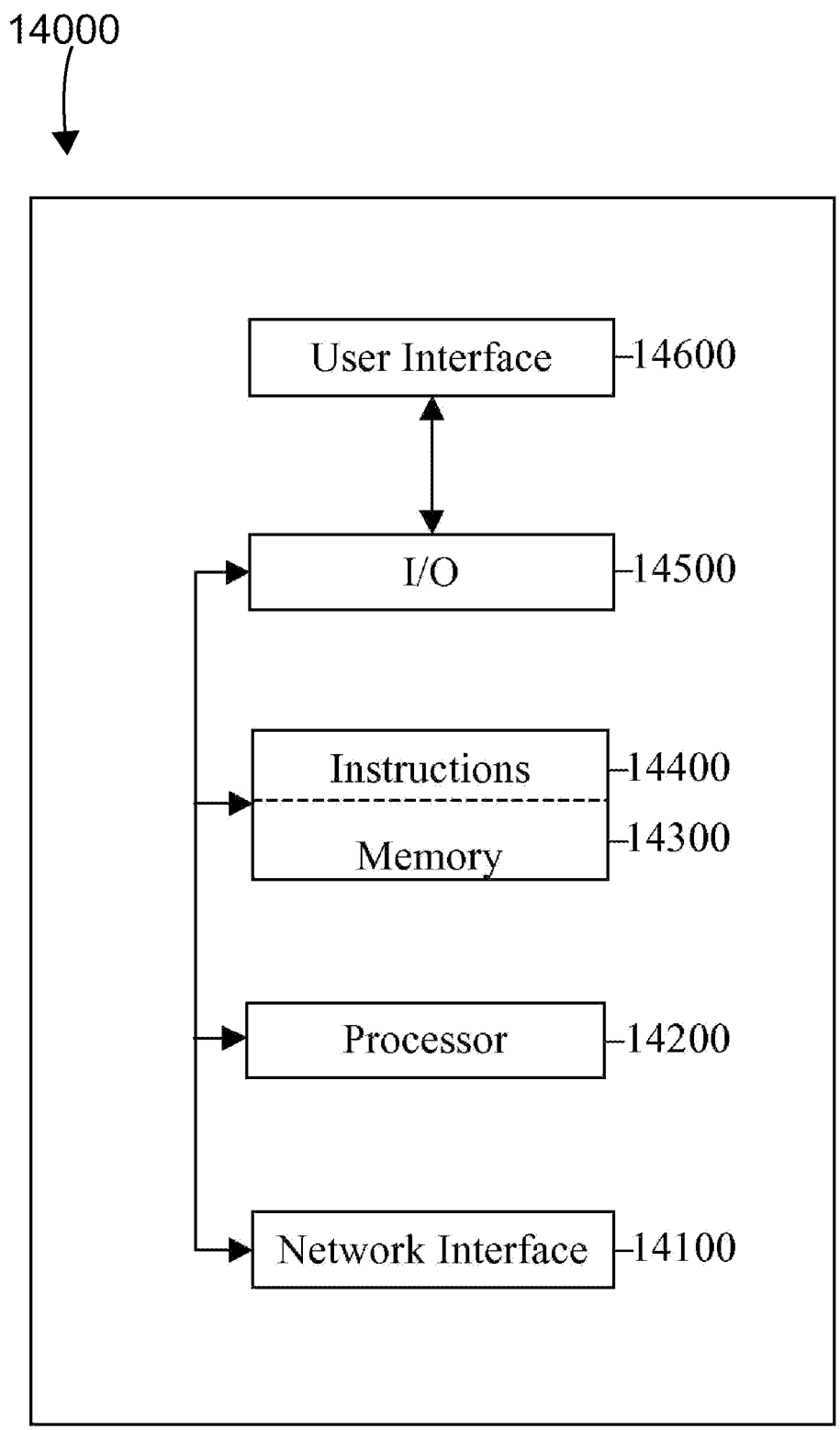
FIG. 14 is a block diagram of an exemplary embodiment of an information device.

FIG. 14 is a block diagram of an exemplary embodiment of an information device 14000, which in certain operative embodiments can comprise, for example, controller 1420 of FIG. 1 and/or controller 5320, 5340, and/or 5360 of FIG. 5. Information device 14000 can comprise any of numerous transform circuits, which can be formed via any of numerous communicatively-, electrically-, magnetically-, optically-, fluidically-, and/or mechanically-coupled physical components, such as for example, one or more network interfaces 14100, one or more processors 14200, one or more memories 14300 containing instructions 14400, one or more input/output (I/O) devices 14500, and/or one or more user interfaces 14600 coupled to I/O device 14500, etc.

In certain exemplary embodiments, via one or more user interfaces 14600, such as a graphical user interface, a user can view a rendering of information related to researching, designing, modeling, creating, developing, building, manufacturing, operating, maintaining, storing, marketing, selling, delivering, selecting, specifying, requesting, ordering, receiving, returning, rating, and/or recommending any of the products, services, methods, user interfaces, and/or information described herein.

Figure 15:
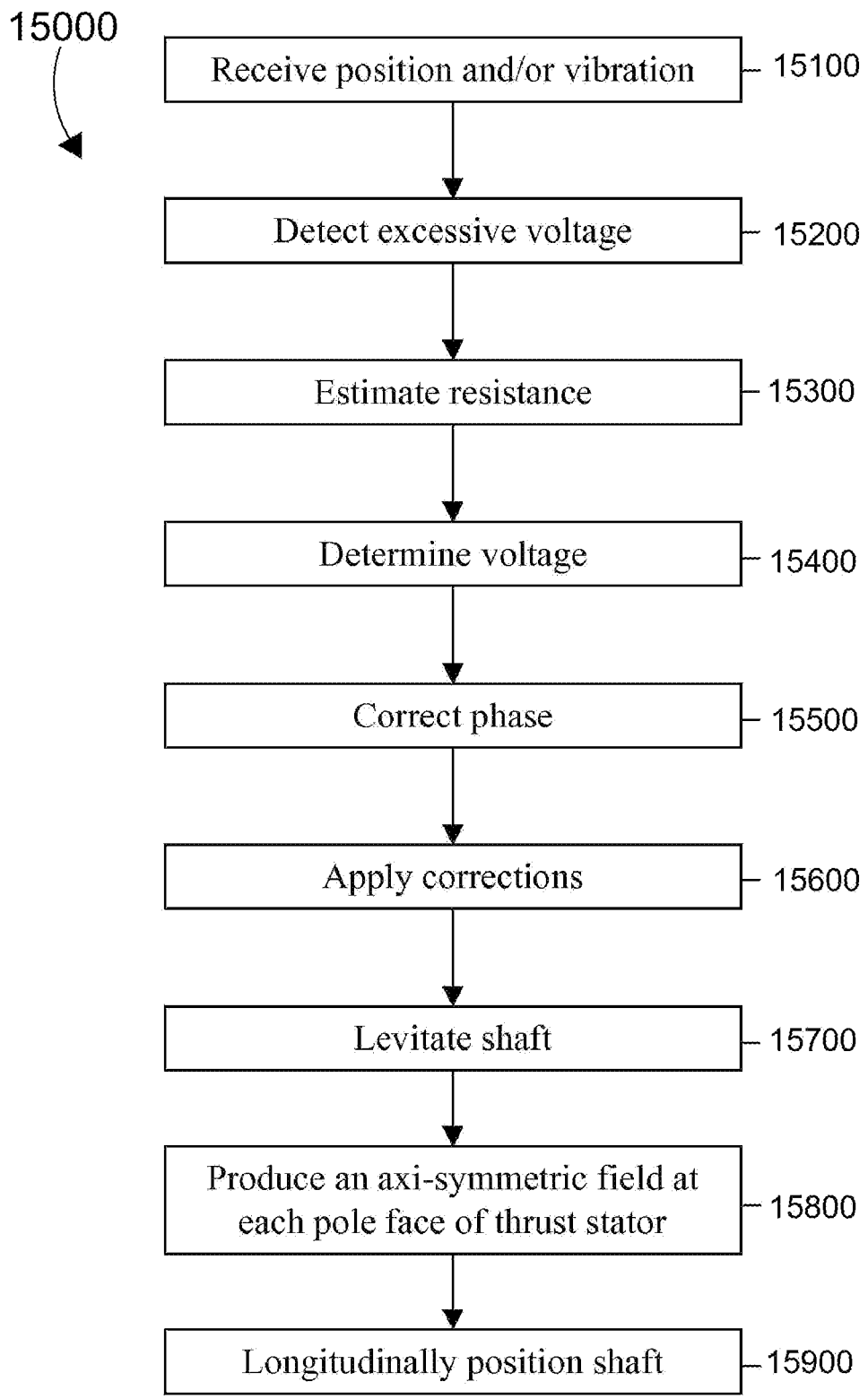
FIG. 15 is a flowchart of an exemplary embodiment of a method.

FIG. 15 is a flowchart of an exemplary embodiment of a method 15000, which can include any combination of the following activities. At activity 15100, a controller can receive a sensed, detected, and/or transmitted indication of a position of a rotating shaft and/or a sensed, detected, and/or transmitted indication of a stator magnetic bearing-generated vibration. At activity 15200, the controller can detect, recognize, and/or determine that an applied coil voltage exceeds a coil amplifier voltage capability. At activity 15300, the controller can estimate a resistance of a coil. At activity 15400, the controller can determine a voltage to be delivered to a coil. At activity 15500, the controller can correct a phase of a flux of a magnet corresponding to a coil. At activity 15600, the controller can adaptively apply sufficient corrections to a received position signal and/or a magnetic bearing force of said shaft to attenuate a stator magnetic bearing-generated vibration, such as a vibration that is transmitted synchronously with a rotational frequency of said shaft and/or one or more harmonics of said rotational frequency. At activity 15700, at least two magnetic radial bearings can magnetically levitate a rotating shaft, each of the magnetic radial bearings comprising at least three stator magnet groups, each of the stator magnet groups comprising at least three stator magnets that are substantially uniformly distributed around a longitudinal axis of the rotating shaft, no pair of the at least three stator magnets separated by 180 degrees measured about the longitudinal axis, each of the stator magnet groups operatively adapted to fully support the rotating shaft independently of each other of the stator magnet groups. At activity 15800, via a thrust stator of a magnetic bearing, the thrust stator adapted to be split into sectors so that a shaft of a machine can be removed from the magnetic bearing, producing an axi-symmetric field at each pole face of the thrust stator when the sectors are operatively assembled in the machine. At activity 15900, at least one magnetic thrust bearing can longitudinally position the shaft, the magnetic thrust bearing comprising at least three isolated thrust coils, electromagnets, and/or magnets.

Figure 16:
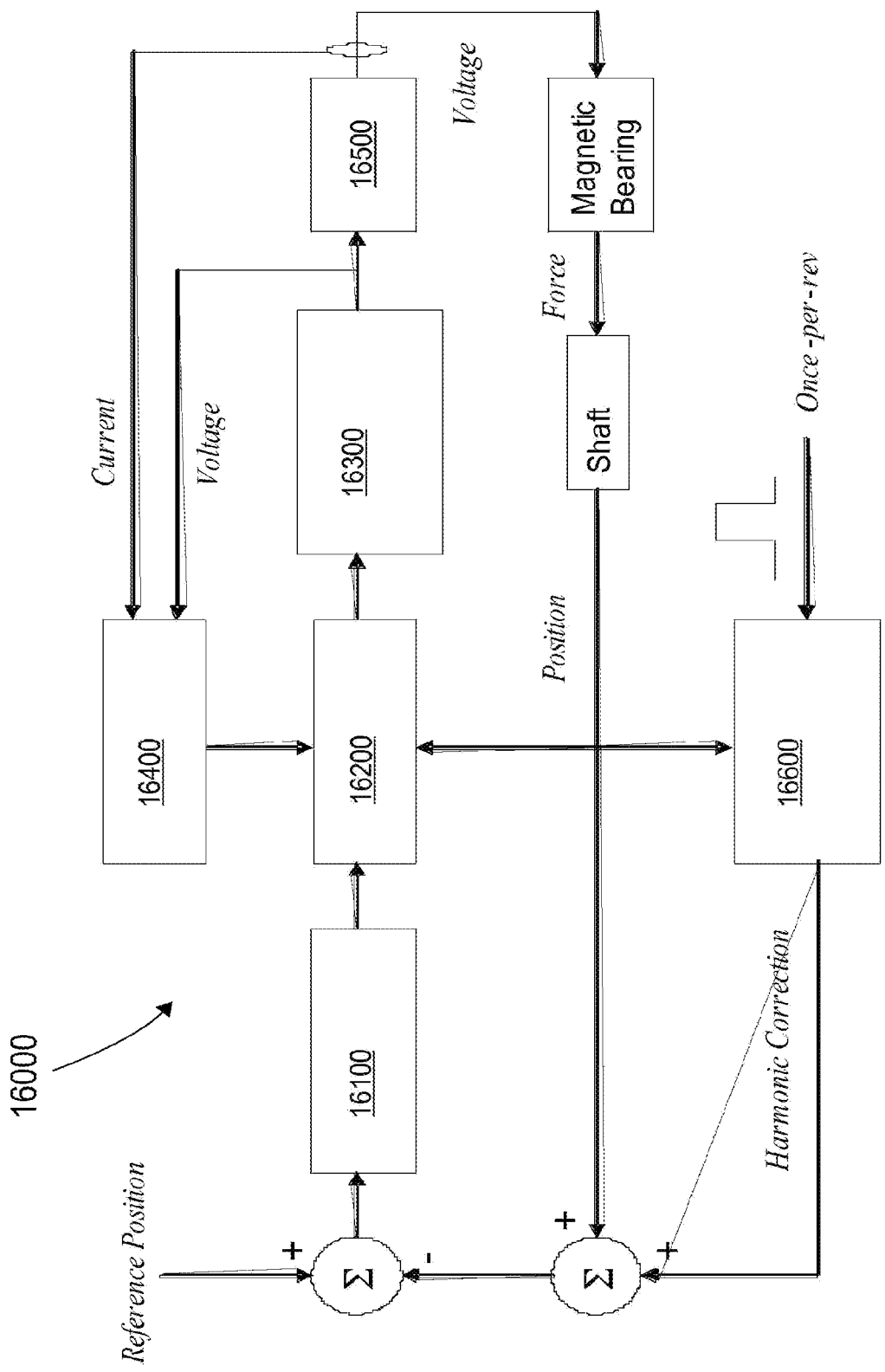
FIG. 16 is a block diagram of an exemplary control process.

FIG. 16 is a block diagram of an exemplary control process 16000. A controller can utilize either a single-input/single output (SISO) architecture or a multiple-input/multiple output (MIMO) architecture, either which that can be modified to improve dynamic performance and/or adaptive noise cancellation. Certain exemplary embodiments of the blocks in FIG. 16 can be described as follows, and/or can be implemented as software, firmware, and/or hardware modules and/or as one or more processes.

Compensation Module 16100.

The compensation module can determine what level of force should be applied based on the position error. The simplest of such approaches can be a PID process, which can be thought of as first-order transfer function with an integrator term. We generalize this compensation process to be an eighth-order transfer function plus an integrator term. As such, the gain and phase of the compensator can be shaped with eight zeroes and eight poles in an arbitrary manner, including first-order leads, first-order lags, notches, and/or second-order filters. The selection of the location (frequency and/or damping ratio) of these zeroes and/or poles can optimize the performance of the bearing, and/or can be easily accomplished with selection of input parameters via a user interface. This sometimes can be referred to as "tuning" the bearing. Typically, this optimization process can include time to properly characterize the rotating assembly, identify structural resonances in the static structure, and/or stabilize some and/or all of the identified system modes. The input parameters for the compensation module can be chosen using well-known techniques described in various references, such as those described in Mushi, Lin, Allaire, "Design, Construction and Modeling of a Flexible Rotor Active Magnetic Bearing Test Rig", Proceedings of ASME Turbo Expo 2010: Power for Land, Sea and Air GT2010, paper GT2010-23619, presented Jun. 14-18, 2010, Glasgow, UK.

Flux Estimation Module 16200.

To improve the performance of the magnetic bearings, the magnetic flux in the air gap can be estimated using a module and/or process that can include the effects of coil inductance, coil resistance, and/or leakage flux. Because flux can be more closely related to the force in the bearing than current, the performance of the magnetic bearing can be improved, especially at high frequencies and/or high loadings, in which case non-linear effects such as eddy currents and/or magnetic saturation can degrade the performance. This process can have the force command from the compensation process as an input. It then can calculate the voltage required to achieve this level of force.

Dynamic Force Compensation Module 16300.

Under conditions of high dynamic force, the voltage output of the amplifier can be insufficient to "slew" the force at the required rate. This can be referred to as voltage saturation. Voltage saturation also can be caused by excessive high frequency gain and/or by sensor noise. When the amplifier is in a state of voltage saturation, the magnetic bearing can go unstable due to phase lag of the force produced by the magnetic bearing. With our dynamic force compensation module and/or process, this phase lag can be greatly reduced or eliminated by automatically reducing the gain, and/or the bearing can remain very stable, even under conditions of high dynamic force. This can create a dramatic improvement of performance and/or stability of the system. This feature can be important in situations where there is a potential of high dynamic loading. The input for this module and/or process can be the desired voltage calculated by the flux estimation model. The output can be the voltage after it is corrected for voltage saturation effects.

Coil Resistance Module 16400.

The voltage and current from each amplifier constantly can be monitored and/or an estimate for the resistance to the coil continuously can be updated. This resistance value can serve two purposes. For one, it can be used in the flux estimation process to estimate the flux in the coil. Secondly, it can be used to continuously monitor the health of the coil by detecting variations in the resistance.

Voltage Amplifier 16500.

The amplifiers used in the controllers can be pulse wave modulated (PWM) amplifiers in which the output voltage can be controlled by varying the width of the voltage pulse sent to the coils. There need be no inner loop to control the current and there need be no requirement to "flux tune" the amplifiers.

Adaptive Noise Cancellation Module 16600.

The controller can include two enhancements that can use adaptive cancellation modules and/or processes. The "Magnetic Balance" feature can minimize synchronous (once-per-revolution) vibration of the shaft by adaptively injecting a synchronous force correction. By contrast, the "Inertial Balance" feature adaptively can minimize synchronous force in the bearing by adaptively injecting synchronous position correction (the Magnetic Balance and Inertial Balance typically are not simultaneously applied). The Inertial Balance can be extended to reduce acoustic noise at the synchronous frequency and/or for harmonics of the synchronous frequency. For a linear system, the cancellation at one frequency can be independent of the cancellation at other frequencies, and therefore the processes can be extended to multiple harmonic frequencies.

The controller can utilize SISO because it has proven to be a simple and robust technique, as which has been described in various publications, such as Mushi, Lin, Allaire, "Design, Construction and Modeling of a Flexible Rotor Active Magnetic Bearing Test Rig", Proceedings of ASME Turbo Expo 2010: Power for Land, Sea and Air GT2010, paper GT2010-23619, presented Jun. 14-18, 2010, Glasgow, UK. However, the process can be extended to be a multiple input—multiple output (MIMO) controller in which states of the system are independently observed and controlled. MIMO controllers can be successfully used, for example, for systems in which the two rigid body modes of the system vary widely in frequency such that it is difficult to devise a compensation process that adequately stabilizes both modes (decomposition of the displacement into more than two modes can require sensors located at additional planes along the length of the shaft). By using sensors simultaneously from two magnetic bearings, the rigid body displacement of the shaft can be decomposed into the superposition of the two rigid body modes and then the modes can be independently controlled.

Figure 17:
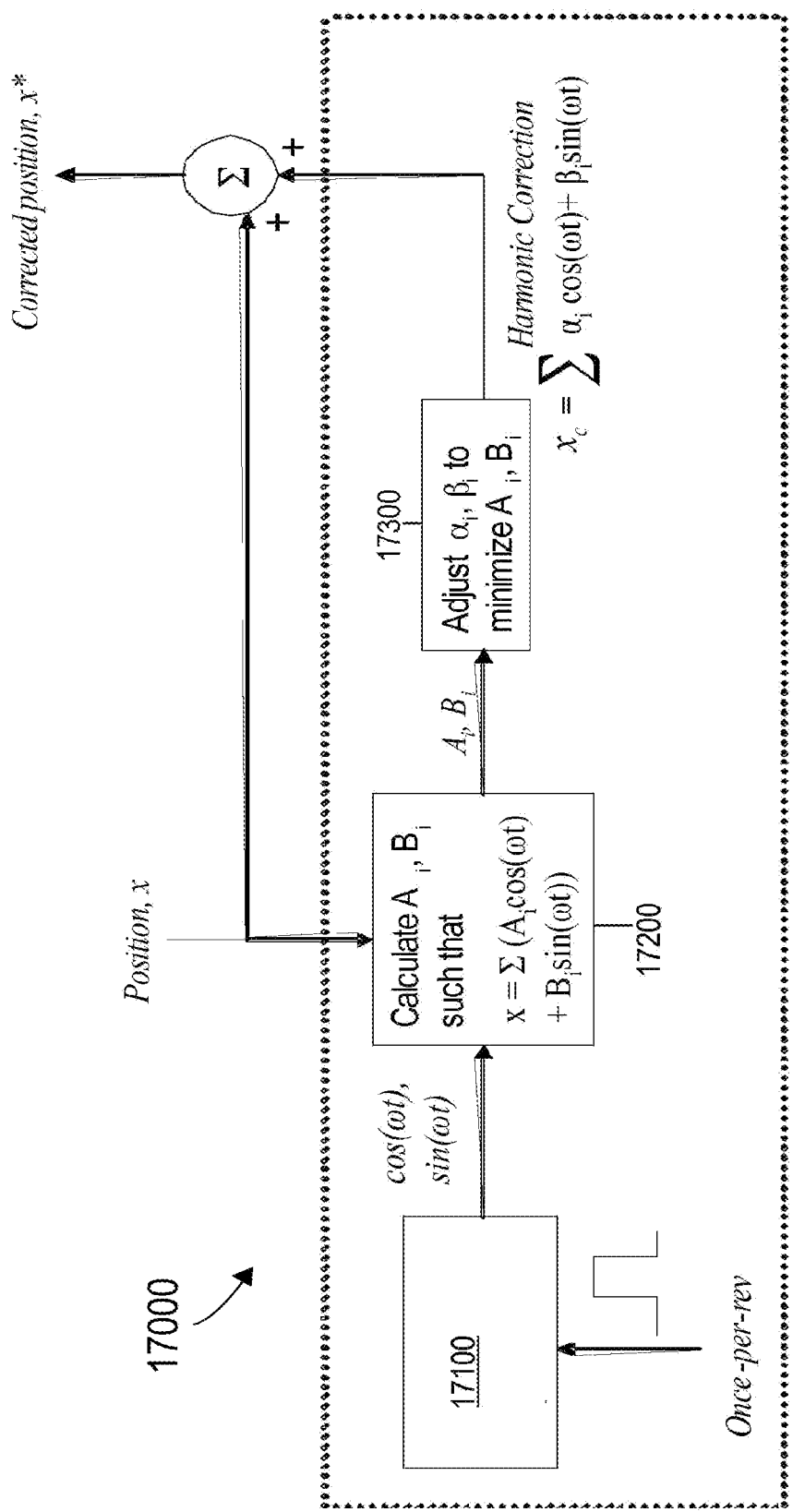
FIG. 17 is a block diagram of an exemplary adaptive cancellation process.

An exemplary way in which noise can be attenuated can be the adaptive control of transmitted forces from the bearings into the structure. The adaptive noise cancellation process can minimize the transmitted force at harmonic frequencies of the rotational frequency. An exemplary embodiment of such a process 17000 and/or module is shown in FIG. 17. A once-per-revolution pulse can be tracked with phase-locked loop (PLL) process 17100. The output of the PLL process 17100 can be a set of sine and cosine signals at integral multiples of the frequency of the once-per-rev signal. For example, if up to the ninth harmonic is to be attenuated, then nine pairs of sine and cosine signals can be utilized. At block 17200, these sine and cosine signals then can be used to compute the Fourier coefficients of the position signal. At block 17300, the Fourier coefficients of the position signal $A_i$, $B_i$ can be minimized by adding a harmonic correction to the position signal, and/or adaptively adjusting the Fourier coefficients of the harmonic correction $\alpha_i$, $\beta_i$ until $A_i$ and $B_i$ are small.

FURTHER EMBODIMENTS

Certain exemplary embodiments can provide a machine comprising a magnetic bearing thrust stator, comprising:
a plurality of stator sectors, each of said stator sectors comprising:
  a semi-circumferentially slotted stator portion comprising a plurality of semi-circumferential poles;
  a first coil portion shaped to fit substantially within said semi-circumferentially slotted stator portion;
  a second coil portion shaped to fit substantially within said semi-circumferentially slotted stator portion;
  a second coil portion shaped to fit substantially within said semi-circumferentially slotted stator portion and adapted to be controlled independently from said first coil portion; and/or
  a second coil portion shaped to fit substantially within said semi-circumferentially slotted stator portion, wherein said first coil portion is adapted to be electrically connected to a first amplifier and said second coil portion is adapted to be electrically connected to a second amplifier that is independent from said first amplifier;

wherein:
  said semi-circumferentially slotted stator portion comprises a plurality of substantially parallel curved slots;
  said first coil portion is adapted to fit substantially within a pair of slots of said semi-circumferentially slotted stator portion;
  a first semi-circumferential pole from said plurality of semi-circumferential poles is opposite in polarity from each adjacent semi-circumferential pole;
  said plurality of semi-circumferential poles comprises a first pole adjacent to a second pole, said first pole having a first magnetic polarity and said second pole having a second magnetic polarity, said first magnetic polarity opposite to said second magnetic polarity;
  said semi-circumferentially slotted stator portion comprises a semi-disc coupled to said plurality of semi-circumferential poles;
  said first coil portion defines a continuous closed loop;
  said first coil portion comprises a pair of semi-toroidal portions coupled by an opposing pair of bends;
  said first coil portion comprises a pair of semi-toroidal portions coupled by an opposing pair of U-shaped bends;
  said magnetic bearing thrust stator is operatively adapted to restrain movement of a rotating shaft along a longitudinal axis of the rotating shaft;
  said first coil portion defines a coil longitudinal axis that is adapted to extend within a plane oriented substantially perpendicularly to the longitudinal axis of the rotating shaft;
  said first coil portion comprises a pair of semi-toroidal portions coupled by an opposing pair of U-shaped bends, each of said U-shaped bends extending substantially perpendicularly to said plane;
  each of said U-shaped bends is adapted to electrically couple to a corresponding U-shaped bend from another stator sector from said plurality of stator sectors;
  said first coil portion is adapted to electrically couple to a corresponding coil portion from another stator sector from said plurality of stator sectors; and/or
  said magnetic bearing thrust stator is adapted to be operatively positioned adjacent to, but displaced from, a thrust rotor.

Certain exemplary embodiments can provide a thrust stator of a magnetic bearing, the thrust stator adapted to be split into sectors so that a shaft of a machine can be removed from the magnetic bearing, the thrust stator operatively adapted to produce an axi-symmetric field at each pole face of the thrust stator when the sectors are assembled in the machine.

Certain exemplary embodiments can provide a method, comprising, via a thrust stator of a magnetic bearing, the thrust stator adapted to be split into sectors so that a shaft of a machine can be removed from the magnetic bearing, producing an axi-symmetric field at each pole face of the thrust stator when the sectors are operatively assembled in the machine.

DEFINITIONS

When the following phrases are used substantively herein, the accompanying definitions apply. These phrases and definitions are presented without prejudice, and, consistent with the application, the right to redefine these phrases via amendment during the prosecution of this application or any application claiming priority hereto is reserved. For the purpose of interpreting a claim of any patent that claims priority hereto, each definition in that patent functions as a clear and unambiguous disavowal of the subject matter outside of that definition.

a—at least one.
about—around.
according—per, agreeing with, conforming with, in accord with, pursuant to, and/or consistent with.
activity—an action, act, deed, function, step, and/or process and/or a portion thereof
adapted to—made suitable and/or fit for a specific use and/or situation.
adaptively—performing differently at different times.
adjacent—close to; lying near; next to; adjoining, and/or within a horizontal radius of approximately 0.01 to approximately 0.5 inches of, including all values and subranges therebetween.
adjust—to change so as to match, fit, adapt, conform, and/or be in a more effective state.
along—through, on, beside, over, in line with, and/or parallel to the length and/or direction of; and/or from one end to the other of
amplifier—a device that increases a magnitude and/or strength of signals passing through it.
an—at least one.
and—in conjunction with.
and/or—either in conjunction with or in alternative to.
annular—shaped like a ring.
another—a different one.
any—one, some, every, and/or all without specification.
aperture—an opening, hole, gap, passage, and/or slit.
apparatus—an appliance or device for a particular purpose
apparent power—a value computed by multiplying the root-mean-square (rms) current by the root-mean-square voltage and commonly measured in units such as volt-amps.
apply—to put to, on, and/or into action and/or service; to implement; and/or to bring into contact with something.
approximate—nearly the same as.
are—to exist.
around—about, surrounding, and/or on substantially all sides of.
assemble—to put, fit, and/or join together.
associate—to join, connect together, and/or relate.
at—in, on, and/or near.
at least—not less than, and possibly more than.
attach—to fasten, secure, couple, and/or join.
attenuate—to lessen, diminish, and/or reduce.
automatically—acting or operating in a manner essentially independent of external influence or control. For example, an automatic light switch can turn on upon "seeing" a person in its view, without the person manually operating the light switch.
axial—located on, around, or in the direction of an axis.
axis—a straight line about which a body and/or geometric object rotates and/or can be conceived to rotate and/or a center line to which parts of a structure and/or body can be referred.
axi-symmetric—substantially circumferentially uniform.
based—being derived from, conditional upon, and/or dependent upon.
bearing—a device that supports, guides, and reduces the friction of motion between fixed and moving machine parts.
bend—a curved and/or angled portion.
between—in a separating interval and/or intermediate to.
Boolean logic—a complete system for logical operations.
but—yet.
by—via and/or with the use or help of.
can—is capable of, in at least some embodiments.
capability—an ability that has potential for use.
cause—to produce an effect.
center—(n) a point that is substantially equally distant from the outer boundaries of something; (v) to move and/or align something with respect to a central point, line, and/or plane.
channel—a control system; a frequency, wavelength, and/or code value; and/or a range associated with the transmission of one or more communication signals; and/or a defined passage, conduit, and/or groove.
circuit—a physical system comprising: an electrically conductive pathway and/or a communications connection established across a switching device (such as logic gates); and/or an electrically conductive pathway and/or a communications connection established across two or more switching devices comprised by a network and between corresponding end systems connected to, but not comprised by the network.
circuit board—a substantially flat plastic and/or fiberglass board on which interconnected circuits and/or components are laminated and/or etched, the circuits having microprocessors, memories, transistors, capacitors, resistors, diodes, and/or other electronic components mechanically mounted and/or electrically coupled directly thereto.
circumference—a boundary line of a substantially circular figure, area, and/or object.
circumferential—around a circumference and/or periphery of an object having a circular shape and/or cross-section.
closed—the result of closing, having boundaries, and/or enclosed.
coil—(n) a continuous loop comprising two or more turns of electrically conductive material. (v) to roll and/or form into a configuration having a substantially spiraled cross-section.
communication—a transmission and/or exchange of information.
component—a constituent element and/or part.
comprising—including but not limited to.
conduct—to act as a medium for conveying something such as heat and/or electricity.
conductor—that which conducts electricity.
conduit—a tube, channel, and/or duct for substantially enclosing electric wires and/or cable.
configure—to make suitable or fit for a specific use or situation.
connect—to join or fasten together.
connection—a physical and/or logical link and/or channel between two or more points in a system. For example, a wire, an optical fiber, a wireless link, and/or a virtual circuit, etc.
contact—to touch.
containing—including but not limited to.
continuous—in a manner substantially uninterrupted in time, sequence, substance, and/or extent, and/or substantially without cessation.
control—(n) a mechanical or electronic device used to operate a machine within predetermined limits; (v) to exercise authoritative and/or dominating influence over, cause to act in a predetermined manner, direct, adjust to a requirement, and/or regulate.
controller—a device and/or set of machine-readable instructions for performing one or more predetermined and/or user-defined tasks. A controller can comprise any one or a combination of hardware, firmware, and/or software. A controller can utilize mechanical, pneumatic, hydraulic, electrical, magnetic, optical, informational, chemical, and/or biological principles, signals, and/or inputs to perform the task(s). In certain embodiments, a controller can act upon information by manipulating, analyzing, modifying, converting, transmitting the information for use by an executable procedure and/or an information device, and/or routing the information to an output device. A controller can be a central processing unit, a local controller, a remote controller, parallel controllers, and/or distributed controllers, etc. The controller can be a general-purpose microcontroller, such the Pentium IV series of microprocessor manufactured by the Intel Corporation of Santa Clara, Calif., and/or the HC08 series from Motorola of Schaumburg, Ill. In another embodiment, the controller can be an Application Specific Integrated Circuit (ASIC) or a Field Programmable Gate Array (FPGA) that has been designed to implement in its hardware and/or firmware at least a part of an embodiment disclosed herein.

convert—to transform, adapt, and/or change.

correct—to remedy, adjust in value, and/or change to a more desired value.

correction—a change to a more desired value.

corresponding—related, associated, accompanying, similar in purpose and/or position, conforming in every respect, and/or equivalent and/or agreeing in amount, quantity, magnitude, quality, and/or degree.

couple—to join, link, and/or connect.

coupleable—capable of being joined, connected, and/or linked together.

coupling—linking in some fashion.

cover—a substantially planar object configured to protect and/or conceal.

create—to bring into being.

current—a flow of electrical energy.

curve—a bend that extends continuously and/or substantially without angles.

data—distinct pieces of information, usually formatted in a special or predetermined way and/or organized to express concepts, and/or represented in a form suitable for processing by an information device.

data structure—an organization of a collection of data that allows the data to be manipulated effectively and/or a logical relationship among data elements that is designed to support specific data manipulation functions. A data structure can comprise meta data to describe the properties of the data structure. Examples of data structures can include: array, dictionary, graph, hash, heap, linked list, matrix, object, queue, ring, stack, tree, and/or vector.

define—to establish the meaning, relationship, outline, form, and/or structure of; and/or to precisely and/or distinctly describe and/or specify.

deliver—to give forth, produce, and/or transfer of possession of desired—indicated, expressed, and/or requested.

detect—to sense, perceive, identify, discover, ascertain, respond to, and/or receive the existence, presence, and/or fact of.

determine—to obtain, calculate, decide, deduce, establish, and/or ascertain.

device—a machine, manufacture, and/or collection thereof.

digital—non-analog and/or discrete.

digital signal processor—a programmable digital microprocessor adaptable to perform calculations and/or manipulations on signals.

disc or disk—a thin, substantially flat, substantially circular object and/or plate.

displace—to separate.

distinct—discrete and/or readily distinguishable from all others.

distribute—to deliver, pass out, and/or spread; to arrange; and/or to disseminate, broadcast, and/or communicate to multiple receivers.

each—every one of a group considered individually.

eddy current—an electric current induced in a massive conductor, such as the core of an electromagnet, transformer, etc., by an alternating magnetic field electrical—relating to producing, distributing, and/or operating by electricity.

electrically—of, relating to, producing, or operated by electricity.

electrically connected—coupled in a manner adapted to transfer electrical energy.

electromagnet—a device comprising a coil of insulated wire wrapped around an iron core that becomes magnetized when an electric current flows through the wire.

electronic—digitally processed, stored, and/or transmitted.

embed—to fix firmly in a surrounding mass, to enclose snugly and/or firmly, and/or to cause to be an integral part of.

estimate—(v.) to calculate and/or determine approximately and/or tentatively; (n.) a value calculated and/or determined approximately and/or tentatively.

Ethernet—a frame-based computer networking technology for local area networks (LANs). It defines wiring and signaling for the physical layer, and frame formats and protocols for the media access control (MAC)/data link layer of the OSI model.

exceeding—greater than.

extend—to reach spatially outward, stretch, cover, and/or span.

external—relating to, existing on, and/or connected with the outside or an outer part; exterior.

face—a significant and/or prominent surface of an object.

field—a region of space characterized by a physical property, such as gravitational or electromagnetic force or fluid pressure, having a determinable value at every point in the region.

first—an initial entity in an ordering of entities and/or immediately preceding the second in an ordering.

fit—adapted to be of the right size and/or shape for; adapted to conform to a shape of flux—the lines of force of an electric or magnetic field; and/or the strength of a field in a given area expressed as the product of the area and the component of the field strength at right angles to the area.

force—a capacity to do work or cause physical change.

frequency—the number of times a specified periodic phenomenon occurs within a specified interval.

from—used to indicate a source, origin, and/or location thereof.

fully—completely.

further—in addition.

gap—an interruption of continuity and/or a space between objects.

generate—to create, produce, give rise to, and/or bring into existence.

group—a plurality of determined units.

haptic—involving the human sense of kinesthetic movement and/or the human sense of touch. Among the many potential haptic experiences are numerous sensations, body-positional differences in sensations, and time-based changes in sensations that are perceived at least partially in non-visual, non-audible, and non-olfactory manners, including the experiences of tactile touch (being touched), active touch, grasping, pressure, friction, traction, slip, stretch, force, torque, impact, puncture, vibration, motion, acceleration, jerk, pulse, orientation, limb position, gravity, texture, gap, recess, viscosity, pain, itch, moisture, temperature, thermal conductivity, and thermal capacity.

harmonic—a wave, signal, movement, and/or vibration whose frequency is a whole-number multiple of that of another; and/or a whole-number multiple of a value of another variable.

having—possessing, characterized by, comprising, and/or including but not limited to.

heat—energy associated with the motion of atoms and/or molecules and capable of being transmitted through solid and fluid media by conduction, through fluid media by convection, and through a fluid and/or empty space by radiation.

heat sink—a device adapted to transfer thermal energy away from a connected object and/or a device that absorbs and/or dissipates heat generated by a system.

housing—something that covers, encloses, protects, holds, and/or supports, such as a frame, box, and/or chassis.

human-machine interface—hardware and/or software adapted to render information to a user and/or receive information from the user; and/or a user interface.

including—including but not limited to.

increase—to become greater or more in size, quantity, number, degree, value, intensity, and/or power, etc.

independently—without the aid of, use of, and/or reliance upon another.

indicative—serving to indicate.

information device—any device capable of processing data and/or information, such as any general purpose and/or special purpose computer, such as a personal computer, workstation, server, minicomputer, mainframe, supercomputer, computer terminal, laptop, wearable computer, and/or Personal Digital Assistant (PDA), mobile terminal, Bluetooth device, communicator, "smart" phone (such as an iPhone and/or Treo-like device), messaging service (e.g., Blackberry) receiver, pager, facsimile, cellular telephone, a traditional telephone, telephonic device, a programmed microprocessor or microcontroller and/or peripheral integrated circuit elements, an ASIC or other integrated circuit, a hardware electronic logic circuit such as a discrete element circuit, and/or a programmable logic device such as a PLD, PLA, FPGA, or PAL, or the like, etc. In general any device on which resides a finite state machine capable of implementing at least a portion of a method, structure, and/or or graphical user interface described herein may be used as an information device. An information device can comprise components such as one or more network interfaces, one or more processors, one or more memories containing instructions, and/or one or more input/output (I/O) devices, one or more user interfaces coupled to an I/O device, etc.

initialize—to prepare something for use and/or some future event.

input—a signal, data, and/or information provided to a processor, device, and/or system.

input/output (I/O) device—any sensory-oriented input and/or output device, such as an audio, visual, haptic, olfactory, and/or taste-oriented device, including, for example, a monitor, display, projector, overhead display, keyboard, keypad, mouse, trackball, joystick, gamepad, wheel, touchpad, touch panel, pointing device, microphone, speaker, video camera, camera, scanner, printer, haptic device, vibrator, tactile simulator, and/or tactile pad, potentially including a port to which an I/O device can be attached or connected.

install—to connect or set in position and prepare for use.

instructions—directions, which can be implemented as firmware and/or software, the directions adapted to perform a particular operation or function.

into—to a condition, state, or form of, and/or toward, in the direction of, and/or to the inside of.

isolate—to segregate, separate, and/or shield from one another.

levitate—to rise, suspend, and/or float, and/or to cause to rise, suspend, and/or float, as if lighter than a surrounding medium.

located—situated in a particular spot and/or position.

logic gate—a physical device adapted to perform a logical operation on one or more logic inputs and to produce a single logic output, which is manifested physically. Because the output is also a logic-level value, an output of one logic gate can connect to the input of one or more other logic gates, and via such combinations, complex operations can be performed. The logic normally performed is Boolean logic and is most commonly found in digital circuits. The most common implementations of logic gates are based on electronics using resistors, transistors, and/or diodes, and such implementations often appear in large arrays in the form of integrated circuits (a.k.a., IC's, microcircuits, microchips, silicon chips, and/or chips). It is possible, however, to create logic gates that operate based on vacuum tubes, electromagnetics (e.g., relays), mechanics (e.g., gears), fluidics, optics, chemical reactions, and/or DNA, including on a molecular scale. Each electronically-implemented logic gate typically has two inputs and one output, each having a logic level or state typically physically represented by a voltage. At any given moment, every terminal is in one of the two binary logic states ("false" (a.k.a., "low" or "0") or "true" (a.k.a., "high" or "1"), represented by different voltage levels, yet the logic state of a terminal can, and generally does, change often, as the circuit processes data. Thus, each electronic logic gate typically requires power so that it can source and/or sink currents to achieve the correct output voltage. Typically, machine-implementable instructions are ultimately encoded into binary values of "0"s and/or "1"s and, are typically written into and/or onto a memory device, such as a "register", which records the binary value as a change in a physical property of the memory device, such as a change in voltage, current, charge, phase, pressure, weight, height, tension, level, gap, position, velocity, momentum, force, temperature, polarity, magnetic field, magnetic force, magnetic orientation, reflectivity, molecular linkage, molecular weight, etc. An exemplary register might store a value of "01101100", which encodes a total of 8 "bits" (one byte), where each value of either "0" or "1" is called a "bit" (and 8 bits are collectively called a "byte"). Note that because a binary bit can only have one of two different values (either "0" or "1"), any physical medium capable of switching between two saturated states can be used to represent a bit. Therefore, any physical system capable of representing binary bits is able to represent numerical quantities, and potentially can manipulate those numbers via particular encoded machine-implementable instructions. This is one of the basic concepts underlying digital computing. At the register and/or gate level, a computer does not treat these "0"s and "1"s as numbers per se, but typically as voltage levels (in the case of an electronically-implemented computer), for example, a high voltage of approximately +3 volts might represent a "1" or "logical true" and a low voltage of approximately 0 volts might represent a "0" or "logical false" (or vice versa, depending on how the circuitry is designed). These high and low voltages (or other physical properties, depending on the nature of the implementation) are typically fed into a series of logic gates, which in turn, through the correct logic design, produce the physical and logical results specified by the particular encoded machine-implementable instructions. For example, if the encoding request a calculation, the logic gates might add the first two bits of the encoding together, produce a result "1" ("0"+"1"="1"), and then write this result into another register for subsequent retrieval and reading. Or, if the encoding is a request for some kind of service, the logic gates might in turn access or write into some other registers which would in turn trigger other logic gates to initiate the requested service.

logical—a conceptual representation.

longitudinal—of and/or relating to a length; placed and/or running lengthwise.

longitudinal axis—a straight line defined parallel to an object's length and passing through a centroid of the object.

loop—a closed polygon that lacks sharp angular turns and does not cross over itself, such as a circular, elliptical, and/or oval shape, and/or a gently bent version thereof.

machine—a device and/or vehicle adapted to perform at least one task.

machine-implementable instructions—directions adapted to cause a machine, such as an information device, to perform one or more particular activities, operations, and/or functions. The directions, which can sometimes form an entity called a "processor", "kernel", "operating system", "program", "application", "utility", "subroutine", "script", "macro", "file", "project", "module", "library", "class", and/or "object", etc., can be embodied and/or encoded as machine code, source code, object code, compiled code, assembled code, interpretable code, and/or executable code, etc., in hardware, firmware, and/or software.

machine-readable medium—a physical structure from which a machine, such as an information device, computer, microprocessor, and/or controller, etc., can store and/or obtain machine-implementable instructions, data, and/or information. Examples include a memory device, punch cards, etc.

magnetic—having the property of attracting iron and certain other materials by virtue of a surrounding field of force.

magnetic bearing—a bearing that supports a load using magnetic levitation.

magnetic flux level—a measure of a quantity of magnetism, being the total number of magnetic lines of force passing through a specified area in a magnetic field. Also known as magnetic flux density per unit area, the SI unit for which is the weber.

magnitude—a size and/or extent.

maintain—to retain, preserve, sustain, keep in an existing state, and/or continue to obtain.

may—is allowed and/or permitted to, in at least some embodiments.

measured—determined, as a dimension, quantification, and/or capacity, etc. by observation.

memory device—an apparatus capable of storing, sometimes permanently, machine-implementable instructions, data, and/or information, in analog and/or digital format. Examples include at least one non-volatile memory, volatile memory, register, relay, switch, Random Access Memory, RAM, Read Only Memory, ROM, flash memory, magnetic media, hard disk, floppy disk, magnetic tape, optical media, optical disk, compact disk, CD, digital versatile disk, DVD, and/or raid array, etc. The memory device can be coupled to a processor and/or can store and provide instructions adapted to be executed by processor, such as according to an embodiment disclosed herein.

method—one or more acts that are performed upon subject matter to be transformed to a different state or thing and/or are tied to a particular apparatus, said one or more acts not a fundamental principal and not pre-empting all uses of a fundamental principal.

model—to calculate, estimate, or predict.

mount—(n) that upon which a thing is attached. (v) to couple, fix, and/or attach on and/or to something.

movement—an act or instance of moving and/or a change in position from one location to another.

net—overall, resulting, and/or average.

network—a communicatively coupled plurality of nodes, communication devices, and/or information devices. Via a network, such nodes and/or devices can be linked, such as via various wireline and/or wireless media, such as cables, telephone lines, power lines, optical fibers, radio waves, and/or light beams, etc., to share resources (such as printers and/or memory devices), exchange files, and/or allow electronic communications therebetween. A network can be and/or can utilize any of a wide variety of sub-networks and/or protocols, such as a circuit switched, public-switched, packet switched, connection-less, wireless, virtual, radio, data, telephone, twisted pair, POTS, non-POTS, DSL, cellular, telecommunications, video distribution, cable, terrestrial, microwave, broadcast, satellite, broadband, corporate, global, national, regional, wide area, backbone, packet-switched TCP/IP, IEEE 802.03, Ethernet, Fast Ethernet, Token Ring, local area, wide area, IP, public Internet, intranet, private, ATM, Ultra Wide Band (UWB), Wi-Fi, BlueTooth, Airport, IEEE 802.11, IEEE 802.11a, IEEE 802.11b, IEEE 802.11g, X-10, electrical power, multi-domain, and/or multi-zone sub-network and/or protocol, one or more Internet service providers, one or more network interfaces, and/or one or more information devices, such as a switch, router, and/or gateway not directly connected to a local area network, etc., and/or any equivalents thereof.

network interface—any physical and/or logical device, system, and/or process capable of coupling an information device to a network. Exemplary network interfaces comprise a telephone, cellular phone, cellular modem, telephone data modem, fax modem, wireless transceiver, communications port, ethernet card, cable modem, digital subscriber line interface, bridge, hub, router, or other similar device, software to manage such a device, and/or software to provide a function of such a device.

no—an absence of and/or lacking any.
non-magnetic—not magnetic.
operatively—in a manner able to function and/or to work.
opposing—opposite; against; being the other of two complementary or mutually exclusive things; and/or placed or located opposite, in contrast, in counterbalance, and/or across from something else and/or from each other.
orient—to position a first object relative to a second object.
oscillator—a circuit and/or device for producing an alternating current and/or voltage of a required frequency.
other—a different and/or distinct entity and/or not the same as already mentioned and/or implied.
output—(n) something produced and/or generated; data produced by an information device executing machine-readable instructions; and/or the energy, power, work, signal, and/or information produced by a system. (v) to provide, produce, manufacture, and/or generate.
outwardly—toward an outer surface and/or circumference of
packet—a generic term for a bundle of data organized in a specific way for transmission, such as within and/or across a network, such as a digital packet-switching network, and comprising the data to be transmitted and certain control information, such as a destination address.
pair—a quantity of two of something.
parallel—of, relating to, and/or designating lines, curves, planes, and/or surfaces everywhere equidistant.
partially—to a degree, but not necessarily totally.
past—a time that has occurred.
perceptible—capable of being perceived by the human senses.
perpendicular—intersecting at or forming substantially right angles.
phase—a number of portions of a complete rotational cycle of a machine; a fraction of a complete cycle elapsed as measured from a specified reference point and often expressed as an angle; and/or a measure of an angular relationship between time-varying currents and voltages in an AC circuit.
physical—tangible, real, and/or actual.
physically—existing, happening, occurring, acting, and/or operating in a manner that is tangible, real, and/or actual.
physically separated—spaced apart.
plane—a substantially flat surface and/or a surface containing all the straight lines that connect any two points on it.
plate—a flat rigid body.
plurality—the state of being plural and/or more than one.
polarity—an electrical potential relative to a reference electrical potential that determines a direction of electron flow, from negative to positive, in a direct current circuit.
pole—one of two or more regions in a magnetized body at which the magnetic flux density is concentrated.
portion—a part, component, section, percentage, ratio, and/or quantity that is less than a larger whole. Can be visually, physically, and/or virtually distinguishable and/or non-distinguishable.
position—(n) a place and/or location, often relative to a reference point. (v) to place and/or locate.
power—energy, a measure of energy and/or work, and/or a rate at which work is done, expressed as the amount of work per unit time and commonly measured in units such as watt and horsepower.
predetermined—established in advance.
prevent—to impede, hinder, stop, and/or keep from happening.
probability—a quantitative representation of a likelihood of an occurrence.
processor—a hardware, firmware, and/or software machine and/or virtual machine physically adaptable to perform, via boolean logic operating on a plurality of logic gates, a specific task defined by a set of machine-implementable instructions. A processor can utilize mechanical, pneumatic, hydraulic, electrical, magnetic, optical, informational, chemical, and/or biological principles, mechanisms, adaptations, signals, inputs, and/or outputs to perform the task(s). In certain embodiments, a processor can act upon information by manipulating, analyzing, modifying, and/or converting it, transmitting the information for use by machine-implementable instructions and/or an information device, and/or routing the information to an output device. A processor can function as a central processing unit, local controller, remote controller, parallel controller, and/or distributed controller, etc. Unless stated otherwise, the processor can be a general-purpose device, such as a microcontroller and/or a microprocessor, such the Pentium family of microprocessor manufactured by the Intel Corporation of Santa Clara, Calif. In certain embodiments, the processor can be dedicated purpose device, such as an Application Specific Integrated Circuit (ASIC) or a Field Programmable Gate Array (FPGA) that has been designed to implement in its hardware and/or firmware at least a part of an embodiment disclosed herein. A processor can reside on and use the capabilities of a controller.
produce—to generate via a physical effort, manufacture, and/or make.
project—to calculate, estimate, or predict.
provide—to furnish, supply, give, convey, send, and/or make available.
proximity—the state, quality, sense, and/or fact of being near and/or next; the closeness of one thing to another.
pulse—a transient variation of a quantity (such as electric current or voltage) whose value is otherwise constant. Sometimes repeated with a regular period and/or according to some code.
pulse width modulated—encoded via variation of pulse widths
radially—moving and/or directed along a radius.
radially distributed—located at equally spaced positions around a circumference of a circle.
receive—to gather, take, acquire, obtain, accept, get, and/or have bestowed upon.
recommend—to suggest, praise, commend, and/or endorse.
remove—to eliminate, remove, and/or delete, and/or to move from a place or position occupied.
render—to, e.g., physically, chemically, biologically, electronically, electrically, magnetically, optically, acoustically, fluidically, and/or mechanically, etc., transform information into a form perceptible to a human as, for example, data, commands, text, graphics, audio, video, animation, and/or hyperlinks, etc., such as via a visual, audio, and/or haptic, etc., means and/or depiction, such as via a display, monitor, electric paper, ocular implant, cochlear implant, speaker, vibrator, shaker, force-feedback device, stylus, joystick, steering wheel, glove, blower, heater, cooler, pin array, tactile touchscreen, etc.
repeatedly—again and again; repetitively.

report—a presentation of information in a predetermined format.
request—to express a desire for and/or ask for.
resistance—a measure of a voltage drop across a resistor, typically having units of Ohms.
responsive—reacting to an influence and/or impetus.
restrain—to limit and/or restrict.
rotate—to turn about an axis.
rotating—turning about an axis.
rotation—an act or process of turning around a center or an axis.
rotational—about and/or around an axis.
rotational speed—a velocity at which an object turns around a center or an axis. A rotational speed can be expressed in terms of a number of revolutions in a given time period.
rotor—a rotating part of a machine.
said—when used in a system or device claim, an article indicating a subsequent claim term that has been previously introduced.
second—immediately following an initial item in an ordering.
sector—a portion of a circle bounded by two radii and the included arc.
secure—to fasten, connect, and/or prevent substantial relative movement of.
select—to make a choice or selection from alternatives.
semi-—partial, partially, partly, not completely, and/or a portion of
semi-circumferentially—extending around a portion of a circumference and/or periphery of an object having a semi-circular shape and/or cross-section.
semi-disc—a portion of a disc.
semi-toroidal—characterized by a portion of a toroid.
sender—a source of a transmission.
sensor—a device adapted to automatically sense, perceive, detect, and/or measure a physical property (e.g., pressure, temperature, flow, mass, heat, light, sound, humidity, proximity, position, velocity, vibration, loudness, voltage, current, capacitance, resistance, inductance, magnetic flux, and/or electro-magnetic radiation, etc.) and convert that physical quantity into a signal. Examples include position sensors, proximity switches, stain gages, photo sensors, thermocouples, level indicating devices, speed sensors, accelerometers, electrical voltage indicators, electrical current indicators, on/off indicators, and/or flowmeters, etc.
separated—not touching and/or spaced apart by something.
server—an information device and/or a process running thereon, that is adapted to be communicatively coupled to a network and that is adapted to provide at least one service for at least one client, i.e., for at least one other information device communicatively coupled to the network and/or for at least one process running on another information device communicatively coupled to the network. One example is a file server, which has a local drive and services requests from remote clients to read, write, and/or manage files on that drive. Another example is an e-mail server, which provides at least one program that accepts, temporarily stores, relays, and/or delivers e-mail messages. Still another example is a database server, which processes database queries. Yet another example is a device server, which provides networked and/or programmable: access to, and/or monitoring, management, and/or control of, shared physical resources and/or devices, such as information devices, printers, modems, scanners, projectors, displays, lights, cameras, security equipment, proximity readers, card readers, kiosks, POS/retail equipment, phone systems, residential equipment, HVAC equipment, medical equipment, laboratory equipment, industrial equipment, machine tools, pumps, fans, motor drives, scales, programmable logic controllers, sensors, data collectors, actuators, alarms, annunciators, and/or input/output devices, etc.
set—a related plurality.
shaft—a long, generally cylindrical bar that is adapted to rotate about a longitudinal axis and to transmit power.
shape—a characteristic surface, outline, and/or contour of an entity.
shield—(n) a protective device or structure; (v) to cover up, conceal, and/or protect from, such as to protect from electromagnetic radiation and/or magnetic flux.
side—a surface bounding a solid object.
signal—automatically detectable variations in a physical variable, such as a pneumatic, hydraulic, acoustic, fluidic, mechanical, electrical, magnetic, optical, chemical, and/or biological variable, such as power, energy, pressure, flowrate, viscosity, density, torque, impact, force, frequency, phase, voltage, current, resistance, magnetomotive force, magnetic field intensity, magnetic field flux, magnetic flux density, reluctance, permeability, index of refraction, optical wavelength, polarization, reflectance, transmittance, phase shift, concentration, and/or temperature, etc., that encode information, such as machine-implementable instructions for activities and/or one or more letters, words, characters, symbols, signal flags, visual displays, and/or special sounds, etc., having prearranged meaning Depending on the context, a signal and/or the information encoded therein can be synchronous, asynchronous, hard real-time, soft real-time, non-real time, continuously generated, continuously varying, analog, discretely generated, discretely varying, quantized, digital, broadcast, multicast, unicast, transmitted, conveyed, received, continuously measured, discretely measured, processed, encoded, encrypted, multiplexed, modulated, spread, de-spread, demodulated, detected, de-multiplexed, decrypted, and/or decoded, etc.
slot—an opening having a longer length than a width of the opening.
slotted—comprising a narrow opening and/or aperture.
snugly—close-fitting and/or securely.
spacer—an object that defines and/or fills a gap.
spacing—a separation.
special purpose computer—a computer and/or information device comprising a processor device having a plurality of logic gates, whereby at least a portion of those logic gates, via implementation of specific machine-implementable instructions by the processor, experience a change in at least one physical and measurable property, such as a voltage, current, charge, phase, pressure, weight, height, tension, level, gap, position, velocity, momentum, force, temperature, polarity, magnetic field, magnetic force, magnetic orientation, reflectivity, molecular linkage, molecular weight, etc., thereby directly tying the specific machine-implementable instructions to the logic gate's specific configuration and property(ies). In the context of an electronic computer, each such change in the logic gates creates a specific electrical circuit, thereby directly tying the specific machine-implementable instructions to that specific electrical circuit.

special purpose processor—a processor device, having a plurality of logic gates, whereby at least a portion of those logic gates, via implementation of specific machine-implementable instructions by the processor, experience a change in at least one physical and measurable property, such as a voltage, current, charge, phase, pressure, weight, height, tension, level, gap, position, velocity, momentum, force, temperature, polarity, magnetic field, magnetic force, magnetic orientation, reflectivity, molecular linkage, molecular weight, etc., thereby directly tying the specific machine-implementable instructions to the logic gate's specific configuration and property(ies). In the context of an electronic computer, each such change in the logic gates creates a specific electrical circuit, thereby directly tying the specific machine-implementable instructions to that specific electrical circuit.

speed—a linear, curviliear, and/or angular velocity and/or a linear, curviliear, and/or angular distance traveled during a predetermined time interval.

spiral—a path of a point in a plane moving around a central point while, on average, receding from or approaching it. When considering a spiral that generally recedes from the central point, for a given rotation about the central point, the spiral need not have a continuously increasing radius from the central point, however, each successive turn will have an increasing radius. Thus, a portion of a spiral can be linear and/or curvilinear.

split—to break, divide, and/or separate into separate pieces.

stator—a stationary part in or about which another part (the rotor) revolves.

store—to place, hold, retain, enter, and/or copy into and/or onto a machine-readable medium.

sub-circuit—a portion of a circuit.

substantially—to a considerable, large, and/or great, but not necessarily whole and/or entire, extent and/or degree.

sufficient—to a degree necessary to achieve a predetermined result.

supply—make available for use.

support—to bear the weight of, especially from below.

surface—an outer boundary of an object or a material layer constituting or resembling such a boundary.

surround—to encircle, enclose, and/or confine on several and/or all sides.

switch—(n) a mechanical, electrical, and/or electronic device that opens and/or closes circuits, completes and/or breaks an electrical path, and/or selects paths and/or circuits and/or a device that establishes a connection between disparate transmission path segments in a network (or between networks). (v) to electrically energize or de-energize.

synchronously—having the same frequency, period, and/or phase.

system—a collection of devices, machines, articles of manufacture, and/or processes, the collection designed to perform one or more specific functions.

that—a pronoun used to indicate a thing as indicated, mentioned before, present, and/or well known.

thrust—relating to a bearing adapted to restrain displacement substantially parallel to an axis of rotation.

thrust bearing—a bearing arranged to receive a thrust and/or longitudinal axially-directed force on a shaft.

to—a preposition adapted for use for expressing purpose.

toroid—a surface generated by a closed curve rotating about, but not intersecting or containing, an axis in its own plane.

touchdown—relating to contact between a rotor and a stator.

trace—an electrically conductive pathway and/or a communications connection typically formed from solder.

transform—to change in measurable: form, appearance, nature, and/or character.

transistor—a device that regulates current or voltage and acts as a switch or gate for electronic signals.

transmit—to provide, furnish, supply, send as a signal, and/or to convey (e.g., force, energy, and/or information) from one place and/or thing to another.

type—a number of things having in common traits or characteristics that distinguish them as a group or class.

uniformly—evenly.

user interface—any device for rendering information to a user and/or requesting information from the user. A user interface includes at least one of textual, graphical, audio, video, animation, and/or haptic elements. A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element or animation element can be provided, for example, via a monitor, display, projector, and/or other visual device. A haptic element can be provided, for example, via a very low frequency speaker, vibrator, tactile stimulator, tactile pad, simulator, keyboard, keypad, mouse, trackball, joystick, gamepad, wheel, touchpad, touch panel, pointing device, and/or other haptic device, etc. A user interface can include one or more textual elements such as, for example, one or more letters, number, symbols, etc. A user interface can include one or more graphical elements such as, for example, an image, photograph, drawing, icon, window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, button, control, palette, preview panel, color wheel, dial, slider, scroll bar, cursor, status bar, stepper, and/or progress indicator, etc. A textual and/or graphical element can be used for selecting, programming, adjusting, changing, specifying, etc. an appearance, background color, background style, border style, border thickness, foreground color, font, font style, font size, alignment, line spacing, indent, maximum data length, validation, query, cursor type, pointer type, autosizing, position, and/or dimension, etc. A user interface can include one or more audio elements such as, for example, a volume control, pitch control, speed control, voice selector, and/or one or more elements for controlling audio play, speed, pause, fast forward, reverse, etc. A user interface can include one or more video elements such as, for example, elements controlling video play, speed, pause, fast forward, reverse, zoom-in, zoom-out, rotate, and/or tilt, etc. A user interface can include one or more animation elements such as, for example, elements controlling animation play, pause, fast forward, reverse, zoom-in, zoom-out, rotate, tilt, color, intensity, speed, frequency, appearance, etc. A user interface can include one or more haptic elements such as, for example, elements utilizing tactile stimulus, force, pressure, vibration, motion, displacement, temperature, etc.

U-shaped—formed and/or shaped to resemble the letter "U".

varies—changes over time.

via—by way of, with, and/or utilizing.

vibrate—to move back and forth or to and fro, especially rhythmically and/or rapidly.

voltage—(a.k.a., "potential difference" and "electro-motive force" (EMF)) a difference in electrical potential between any two conductors of an electrical circuit and/or a quantity, expressed as a signed number of Volts (V), and measured as a signed difference between two points in an electrical circuit which, when divided by the resistance in Ohms between those points, gives the current flowing between those points in Amperes, according to Ohm's Law.

wedge—an object comprising two substantially planar, substantially radial faces that are separated by an acute angle and are bounded by a substantially arcuate and/or planar face, and comprising an opposing pair of substantially parallel, substantially sector-shaped faces that are substantially perpendicular to the two substantially planar, substantially radial faces.

weight—a value indicative of importance.

Split Magnetic Thrust Bearing when—at a time and/or during the time at which.

wherein—in regard to which; and; and/or in addition to.

with respect to—in relation to.

within—inside the limits of.

NOTE

Various substantially and specifically practical and useful exemplary embodiments of the claimed subject matter are described herein, textually and/or graphically, including the best mode, if any, known to the inventor(s), for implementing the claimed subject matter by persons having ordinary skill in the art. Any of numerous possible variations (e.g., modifications, augmentations, embellishments, refinements, and/or enhancements, etc.), details (e.g., species, aspects, nuances, and/or elaborations, etc.), and/or equivalents (e.g., substitutions, replacements, combinations, and/or alternatives, etc.) of one or more embodiments described herein might become apparent upon reading this document to a person having ordinary skill in the art, relying upon his/her expertise and/or knowledge of the entirety of the art and without exercising undue experimentation. The inventor(s) expects skilled artisans to implement such variations, details, and/or equivalents as appropriate, and the inventor(s) therefore intends for the claimed subject matter to be practiced other than as specifically described herein. Accordingly, as permitted by law, the claimed subject matter includes and covers all variations, details, and equivalents of that claimed subject matter. Moreover, as permitted by law, every combination of the herein described characteristics, functions, activities, substances, and/or structural elements, and all possible variations, details, and equivalents thereof, is encompassed by the claimed subject matter unless otherwise clearly indicated herein, clearly and specifically disclaimed, or otherwise clearly contradicted by context.

The use of any and all examples, or exemplary language (e.g., "such as") provided herein, is intended merely to better illuminate one or more embodiments and does not pose a limitation on the scope of any claimed subject matter unless otherwise stated. No language herein should be construed as indicating any non-claimed subject matter as essential to the practice of the claimed subject matter.

Thus, regardless of the content of any portion (e.g., title, field, background, summary, description, abstract, drawing figure, etc.) of this document, unless clearly specified to the contrary, such as via explicit definition, assertion, or argument, or clearly contradicted by context, with respect to any claim, whether of this document and/or any claim of any document claiming priority hereto, and whether originally presented or otherwise:

there is no requirement for the inclusion of any particular described characteristic, function, activity, substance, or structural element, for any particular sequence of activities, for any particular combination of substances, or for any particular interrelationship of elements;

no described characteristic, function, activity, substance, or structural element is "essential";

any two or more described substances can be mixed, combined, reacted, separated, and/or segregated;

any described characteristics, functions, activities, substances, and/or structural elements can be integrated, segregated, and/or duplicated;

any described activity can be performed manually, semi-automatically, and/or automatically;

any described activity can be repeated, any activity can be performed by multiple entities, and/or any activity can be performed in multiple jurisdictions; and any described characteristic, function, activity, substance, and/or structural element can be specifically excluded, the sequence of activities can vary, and/or the interrelationship of structural elements can vary.

The use of the terms "a", "an", "said", "the", and/or similar referents in the context of describing various embodiments (especially in the context of the following claims) are to be construed to cover both the singular and the plural, unless otherwise indicated herein or clearly contradicted by context.

The terms "comprising," "having," "including," and "containing" are to be construed as open-ended terms (i.e., meaning "including, but not limited to,") unless otherwise noted.

When any number or range is described herein, unless clearly stated otherwise, that number or range is approximate. Recitation of ranges of values herein are merely intended to serve as a shorthand method of referring individually to each separate value falling within the range, unless otherwise indicated herein, and each separate value and each separate sub-range defined by such separate values is incorporated into the specification as if it were individually recited herein. For example, if a range of 1 to 10 is described, that range includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc.

When any phrase (i.e., one or more words) appearing in a claim is followed by a drawing element number, that drawing element number is exemplary and non-limiting on claim scope.

No claim of this document is intended to invoke paragraph six of 35 USC 112 unless the precise phrase "means for" is followed by a gerund.

Any information in any material (e.g., a United States patent, United States patent application, book, article, etc.) that has been incorporated by reference herein, is incorporated by reference herein in its entirety to its fullest enabling extent permitted by law yet only to the extent that no conflict exists between such information and the other statements and drawings set forth herein. In the event of such conflict, including a conflict that would render invalid any claim herein or seeking priority hereto, then any such conflicting information in such material is specifically not incorporated by reference herein.

Within this document, and during prosecution of any patent application related hereto, any reference to any claimed subject matter is intended to reference the precise language of the then-pending claimed subject matter at that particular point in time only.

Accordingly, every portion (e.g., title, field, background, summary, description, abstract, drawing figure, etc.) of this document, other than the claims themselves and any provided definitions of the phrases used therein, is to be regarded as illustrative in nature, and not as restrictive. The scope of subject matter protected by any claim of any patent that issues based on this document is defined and limited only by the precise language of that claim (and all legal equivalents thereof) and any provided definition of any phrase used in that claim, as informed by the context of this document.

What is claimed is:

1. A magnetic bearing thrust stator, comprising:
  a plurality of stator sectors, each stator sector of said plurality of stator sectors configured to abut against another stator sector of said plurality of stator sectors during operation of the magnetic bearing thrust stator, and each stator sector comprising:
    a semi-circumferentially slotted stator portion comprising a plurality of semi-circumferential poles;
    a first coil portion shaped to fit substantially within said semi-circumferentially slotted stator portion, and said first coil portion defining a coil radial axis that is configured to extend within a plane oriented substantially perpendicularly to a longitudinal axis of a rotating shaft, said first coil portion comprising:
      a pair of semi-toroidal portions coupled by an opposing pair of U-shaped bends, each of said opposing pair of U-shaped bends extending axially from said pair of semi-toroidal portions and extending substantially perpendicularly to said plane; and
    a second coil portion shaped to fit substantially within said semi-circumferentially slotted stator portion and configured to be controlled independently from said first coil portion,
  wherein said first coil portion of each stator sector is configured to electrically couple to a corresponding first coil portion of an abutting stator sector during operation of the magnetic bearing thrust stator.

2. The magnetic bearing thrust stator of claim 1, wherein:
said semi-circumferentially slotted stator portion comprises a plurality of substantially parallel curved slots.

3. The magnetic bearing thrust stator of claim 1, wherein:
said first coil portion is configured to fit substantially within a pair of slots of said semi-circumferentially slotted stator portion.

4. The magnetic bearing thrust stator of claim 1, wherein:
a first semi-circumferential pole from said plurality of semi-circumferential poles is opposite in polarity from each adjacent semi-circumferential pole of said plurality of semi-circumferential poles.

5. The magnetic bearing thrust stator of claim 1, wherein:
said plurality of semi-circumferential poles comprises a first pole adjacent to a second pole,
said first pole has a first magnetic polarity and said second pole has a second magnetic polarity, and
said first magnetic polarity is opposite to said second magnetic polarity.

6. The magnetic bearing thrust stator of claim 1, wherein:
said semi-circumferentially slotted stator portion comprises a semi-disc coupled to said plurality of semi-circumferential poles.

7. The magnetic bearing thrust stator of claim 1, wherein:
said first coil portion defines a continuous closed loop.

8. The magnetic bearing thrust stator of claim 1, wherein:
said magnetic bearing thrust stator is operatively configured to restrain movement of the rotating shaft along the longitudinal axis of the rotating shaft.

9. The magnetic bearing thrust stator of claim 1, wherein:
said magnetic bearing thrust stator is configured to be operatively positioned adjacent to, but displaced from, a thrust rotor.

10. The magnetic bearing thrust stator of claim 1,
wherein said first coil portion is configured to be electrically connected to a first amplifier and said second coil portion is adapted to be electrically connected to a second amplifier that is independent from said first amplifier.

* * * * *